United States Patent [19]

Swoboda

[11] Patent Number: 4,799,819
[45] Date of Patent: Jan. 24, 1989

[54] CONNECTOR FOR PROFILED STRUCTURAL MEMBERS

[75] Inventor: Hellmuth Swoboda, Tenniken, Switzerland

[73] Assignee: Connec AG Systembau-Technik, Zug, Switzerland

[21] Appl. No.: 23,654

[22] Filed: Mar. 9, 1987

[30] Foreign Application Priority Data

Mar. 10, 1986 [DE] Fed. Rep. of Germany ....... 3607849

[51] Int. Cl.$^4$ ................................................. F16B 7/04
[52] U.S. Cl. .................................... 403/252; 403/254; 403/187
[58] Field of Search ............... 403/255, 254, 253, 252, 403/256, 231, 196, 194, 201, 187

[56] References Cited

U.S. PATENT DOCUMENTS 3,574,367  4/1971  Jankowski ........................ 403/201
4,345,849  8/1982  Stenemann ....................... 403/252

FOREIGN PATENT DOCUMENTS

1970271[U] 10/1967 Fed. Rep. of Germany .
7341204  5/1975 Fed. Rep. of Germany .
2239370  4/1981 Fed. Rep. of Germany .
2941008  9/1981 Fed. Rep. of Germany .
0059463  9/1982 Fed. Rep. of Germany .
3128595  2/1983 Fed. Rep. of Germany .
2335718  7/1977 France ............................. 403/187
2119054 11/1983 United Kingdom .

Primary Examiner—Andrew V. Kundrat
Attorney, Agent, or Firm—Peter K. Kontler

[57] ABSTRACT

A connector which can releasably couple two confronting or divergent flanges of a profiled structural member with a hollow second member has a housing which is insertable into the second member and contains two retaining arms with hook-shaped jaws projecting from the open front end of the housing. The arms are movable toward or away from each other into and from positions of overlap with the flanges before they are retracted to engage the jaws with the respective flanges. The jaws are movable to positions of overlap with the flanges by one or more displacing members and to retracted positions by one or more motion transmitting members. The displacing members and the motion transmitting members receive motion from one or more eccentrics or disc cams of an actuator which is rotatably mounted in the second member on a shaft which can be disengaged from the second member to allow for extraction of the entire connector from the second member. The shaft is movable axially relative to the actuator and has a polygonal coupling portion which transmits torque to the actuator, and one or more cylindrical portions which are rotatably journalled in a housing of the connector and/or in the second member.

68 Claims, 14 Drawing Sheets

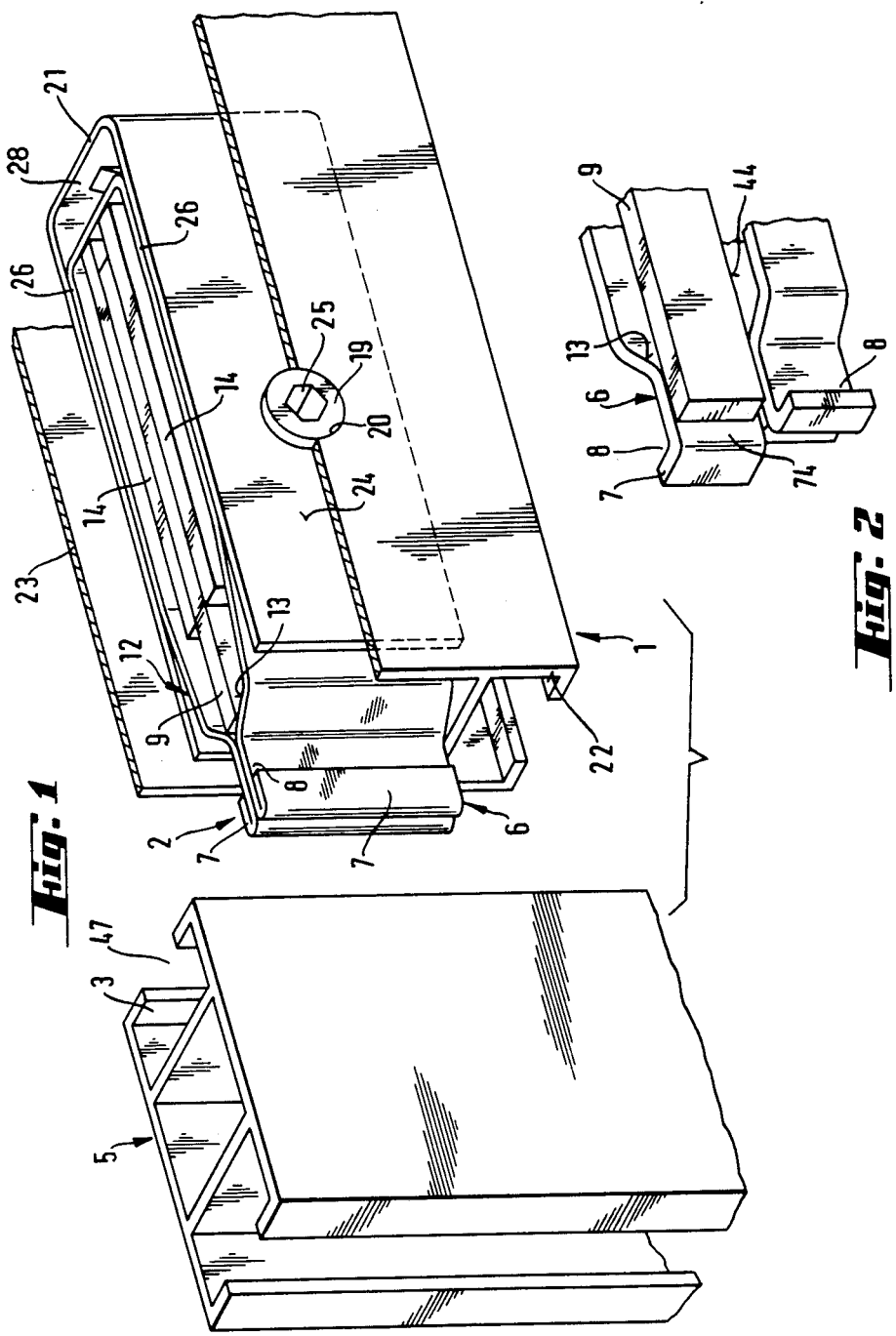

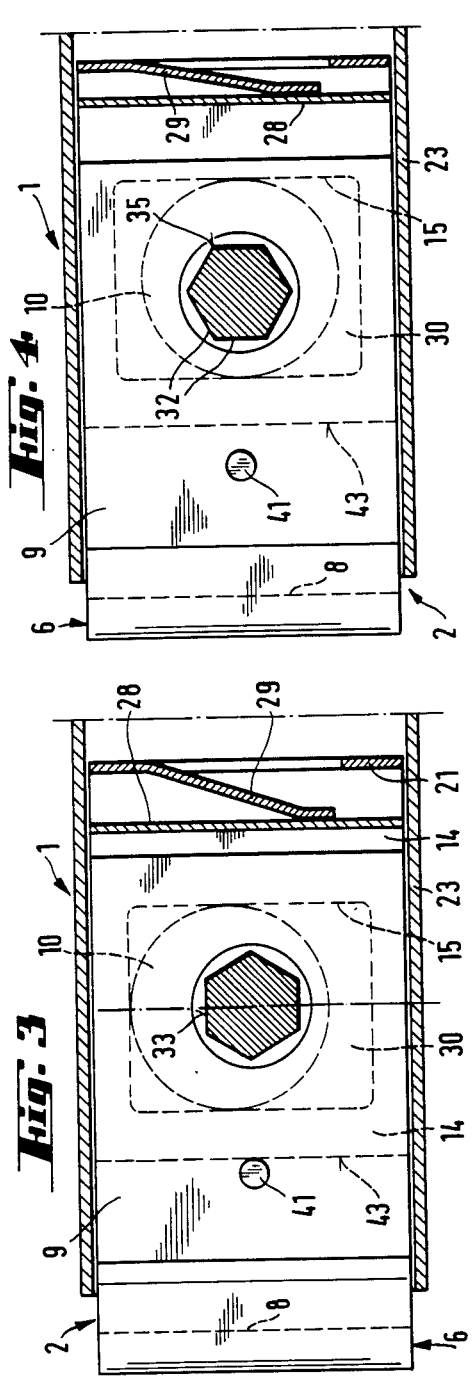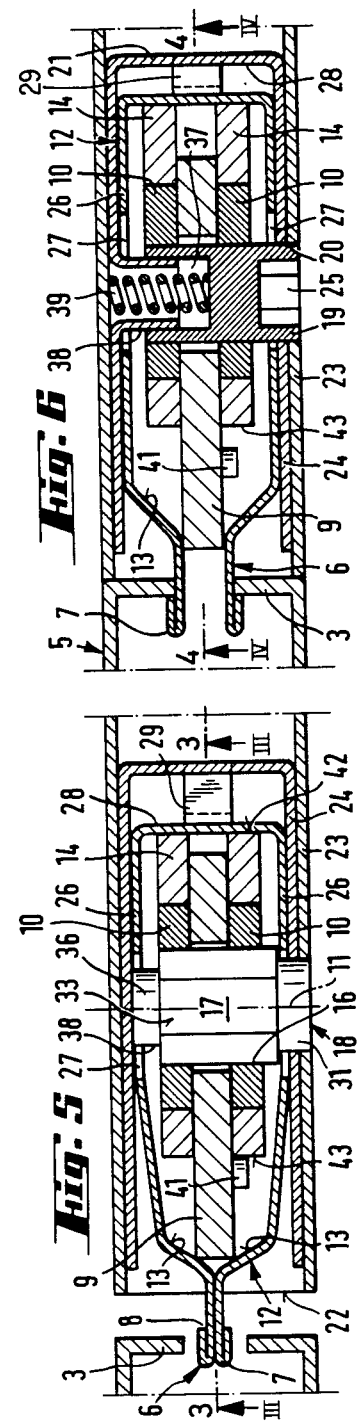

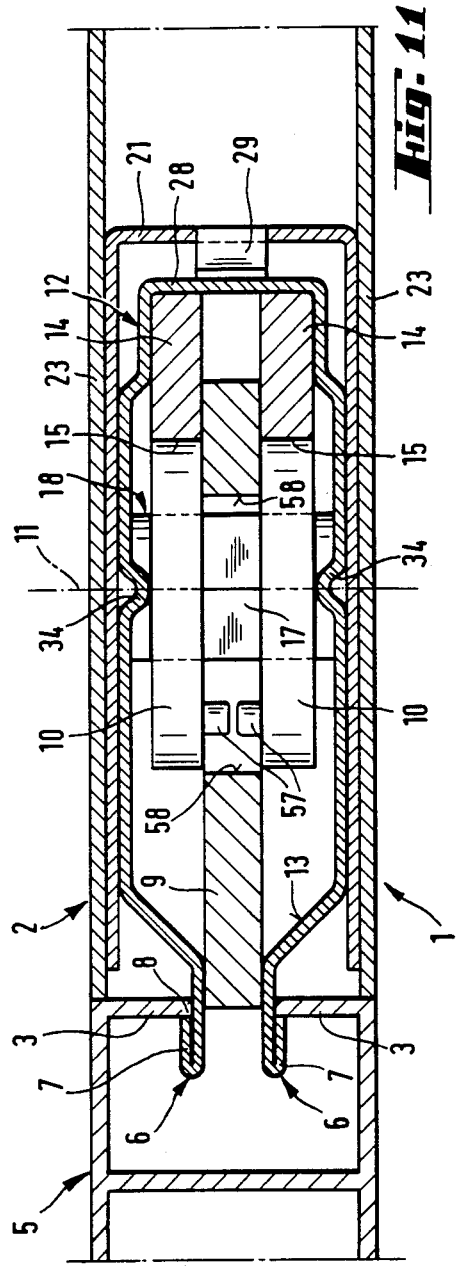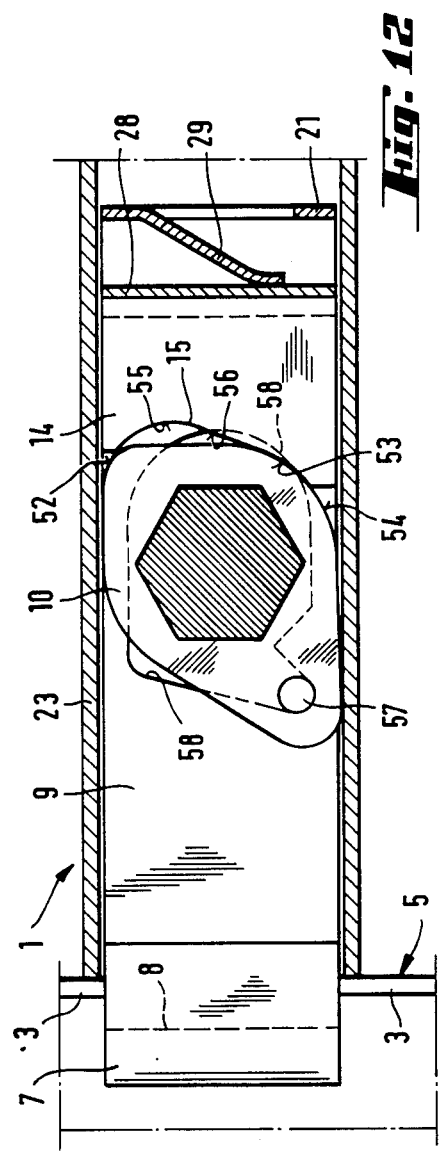

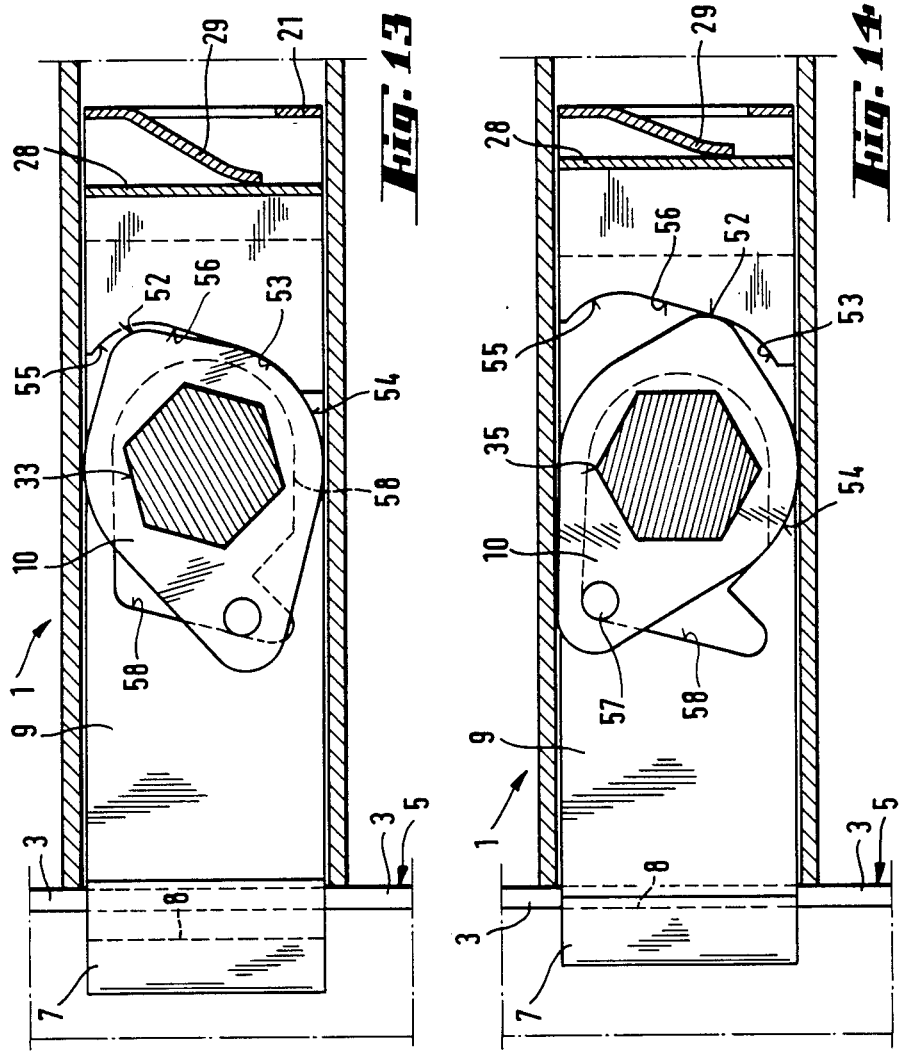

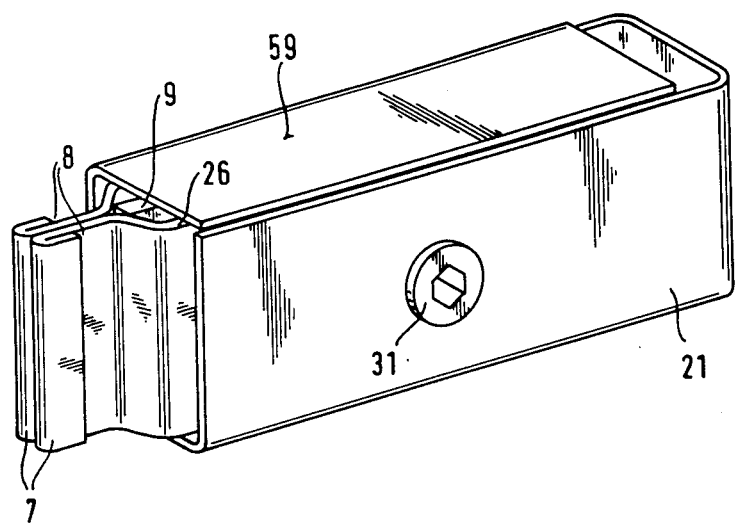
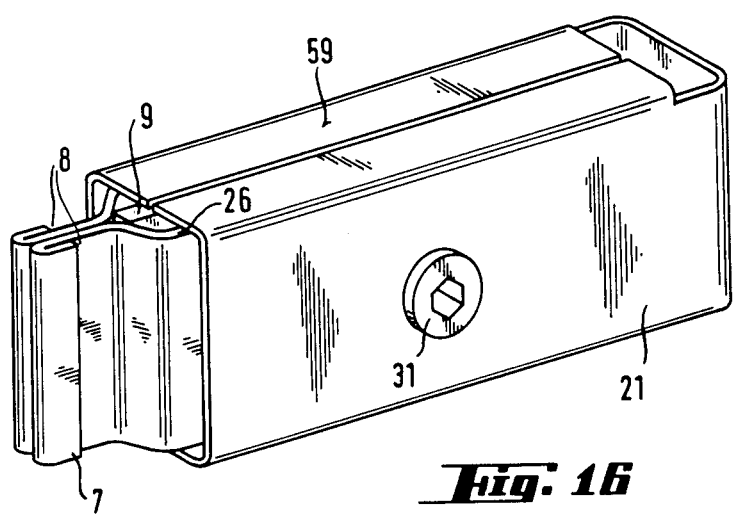

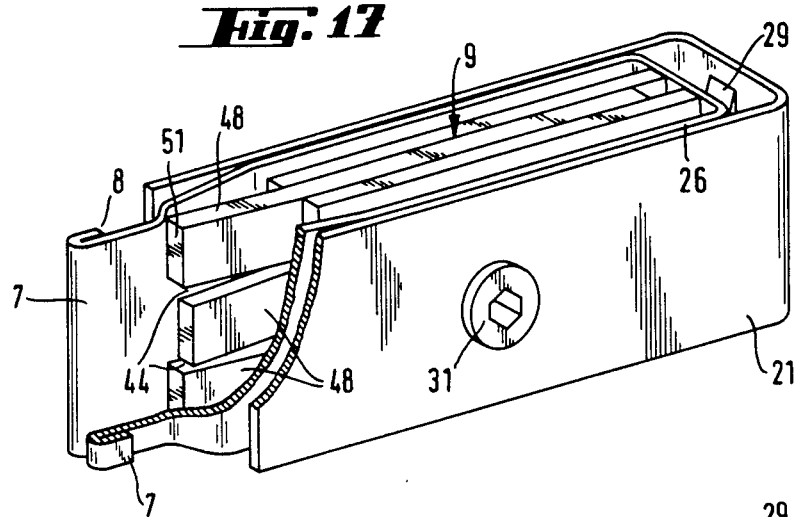
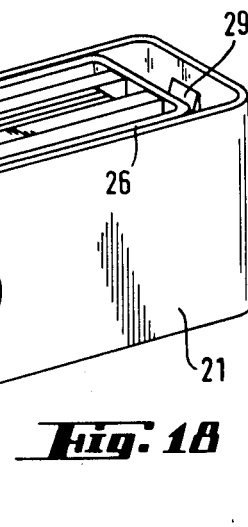
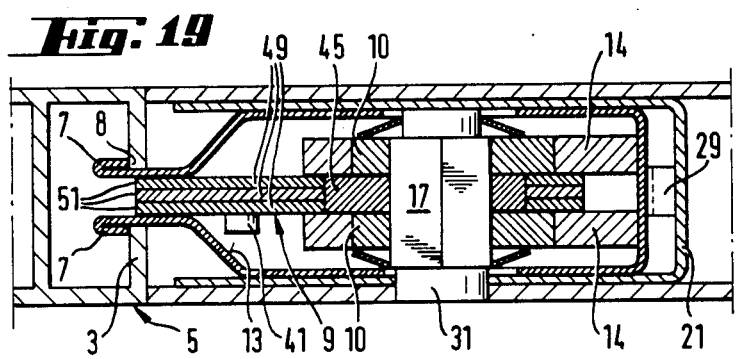

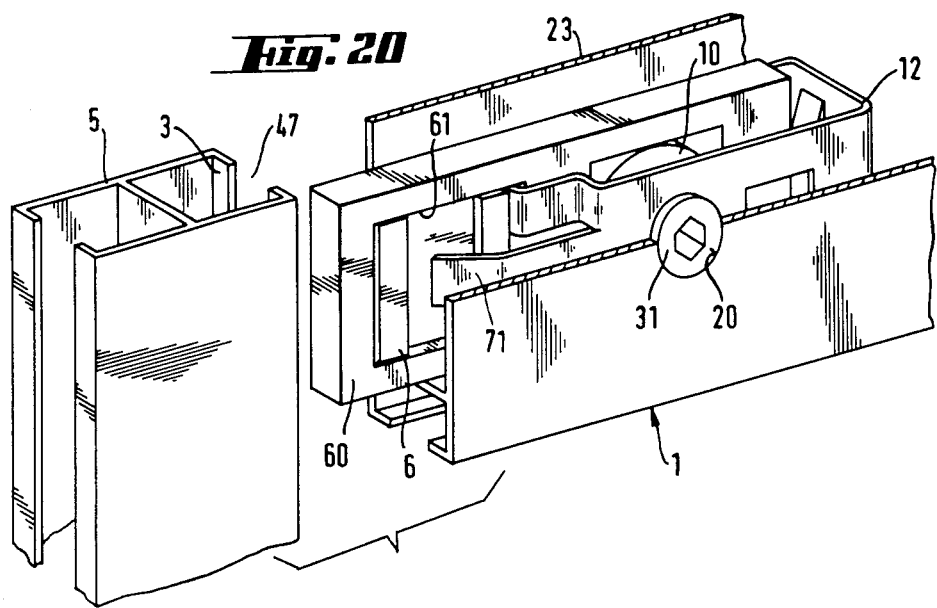
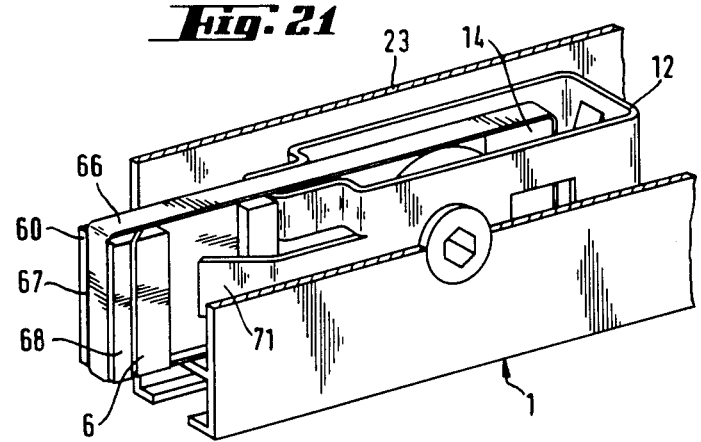

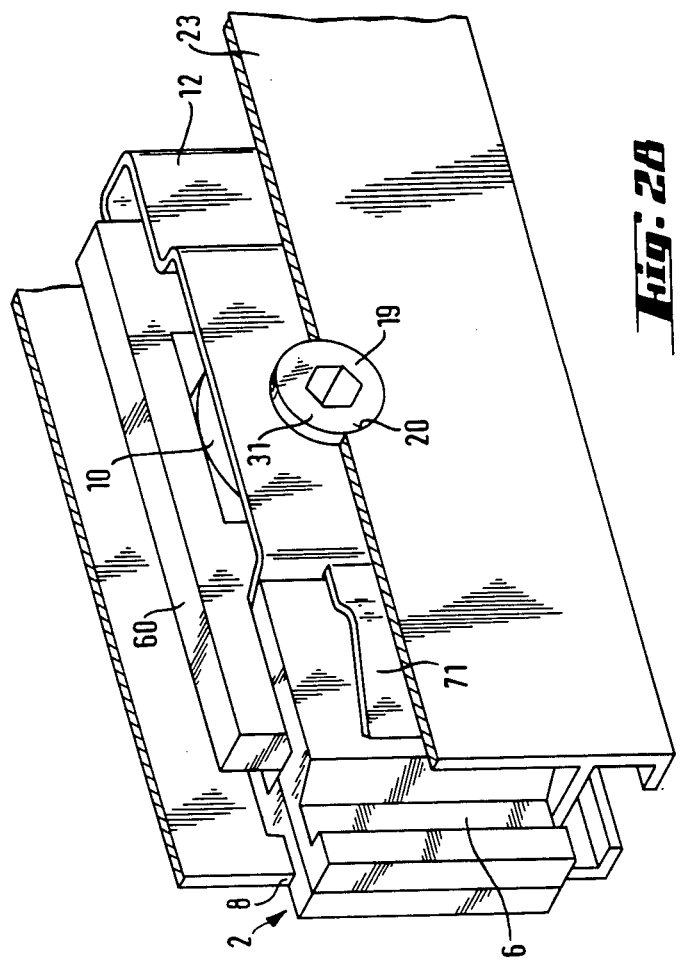
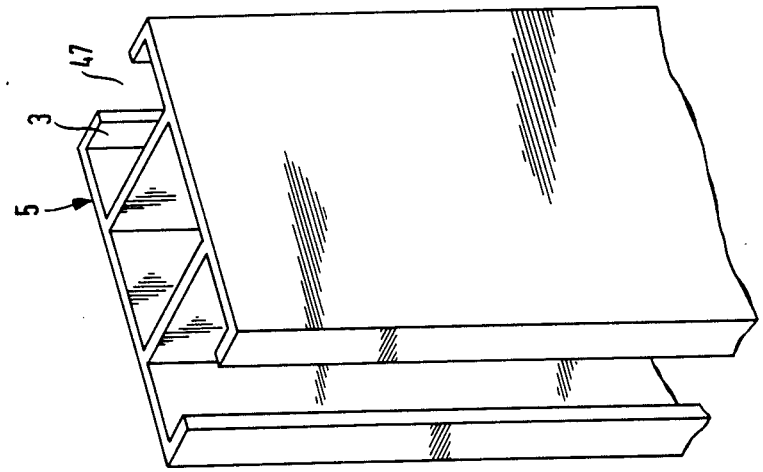

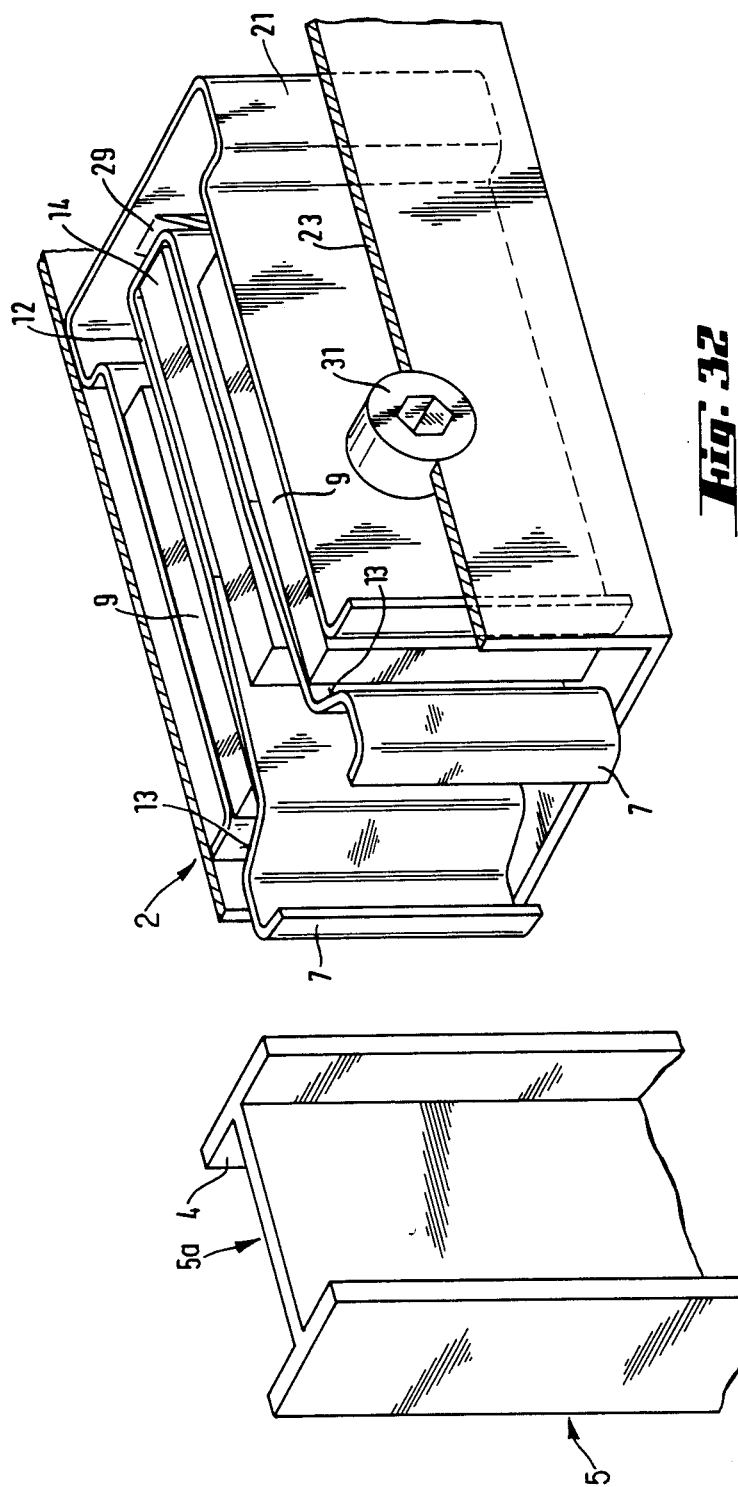

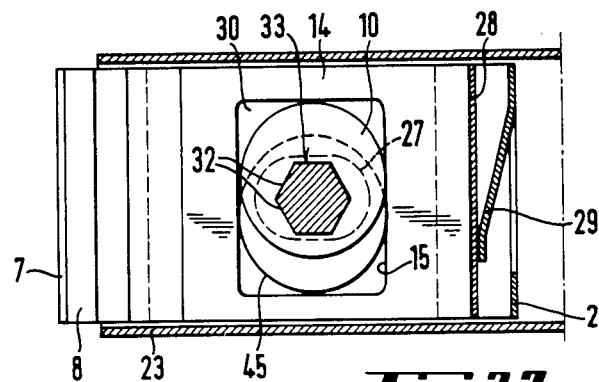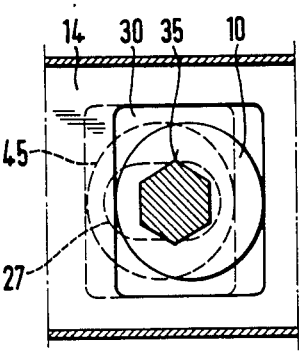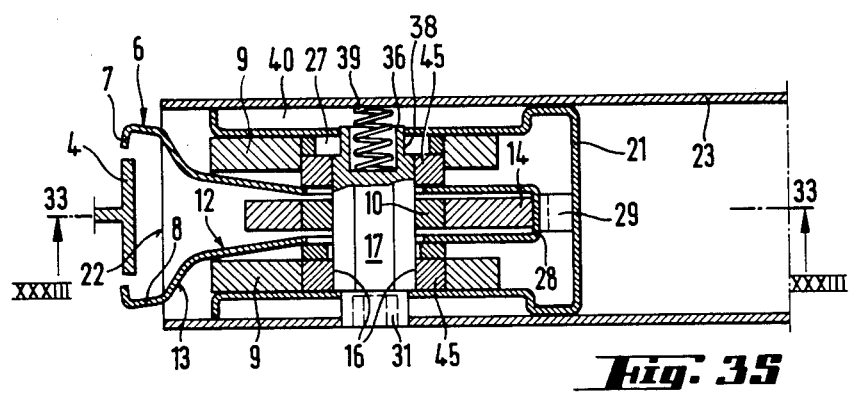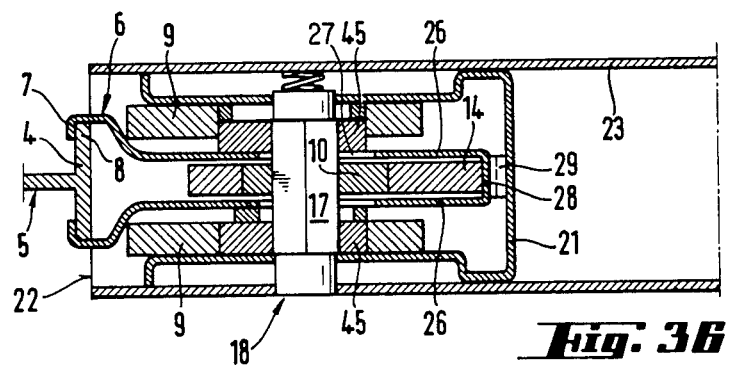

CONNECTOR FOR PROFILED STRUCTURAL MEMBERS

BACKGROUND OF THE INVENTION

The present invention relates to improvements in connectors for profiled bars and analogous structural members. More particularly, the invention relates to improvements in connectors which can be used to separably couple one or more flanges or like parts of a first profiled member to a second profiled member. Such connectors can be used with advantage in the construction industry to separably secure substantially horizontal beams, bars or like components to vertical or otherwise inclined bars, beams or analogous members.

German Pat. No. 29 41 008 to Stenemann discloses a connector wherein a single jaw is movable away from a fixed retainer and is also retractible so that it can be pivoted or otherwise moved away from the fixed retainer in order to overlie a flange of a profiled member to be thereupon moved rearwardly (away from the profiled member) in order to move into requisite engagement with the inner or rear side of the flange. The means for retracting the jaw includes a rotary eccentric, and a stationary wedge is provided to move the jaw away from the fixed retainer in response to retraction of the jaw under the action of the eccentric. The eccentric is in direct motion transmitting engagement with the retractible jaw so that the wear upon the jaw is rather pronounced and can result in unpredictable movements of the jaw relative to the fixed retainer.

Another drawback of the patented connector is that it cannot be readily installed in or on a second member (e.g., a horizontal bar or beam) which is to be coupled to the profiled member. As a rule, the second member has an open front side and defines an internal space which is accessible only from the front side so that the connector must be slipped into and thereupon properly anchored in the second member by entering the internal space by way of the open front side. Problems arise in connection with accessibility of the eccentric which must be rotated from time to time in order to deactivate or reactivate the connector. The arrangement is such that the major part of the connector is installed in the internal space of the second member in a first step, and the eccentric is installed thereafter so as to be placed into proper motion transmitting engagement with the jaw. Installation of the eccentric is followed by insertion thereinto of a rotary member in the form of a shaft which can be rotated by a tool in order to transmit torque to the eccentric. As a rule, the shaft is a press fit in the eccentric so as to avoid the need for additional parts which should hold the shaft in requisite engagement with the eccentric. The press fit must be sufficiently reliable in order to ensure that the shaft will remain in an optimum position after a large number of rotations in order to engage the jaw with or to disengage the jaw from a flange on the profiled member. Problems arise when the shaft must be expelled in order to afford access to remaining parts of the connector, i.e., to allow for extraction or expulsion of the connector from the internal space of the second member. In most instances, the expulsion of the shaft entails an at least partial destruction of the entire connector. The patent to Stenemann discloses the possibility of providing the shaft with a circumferential groove and of forcing the shaft into the opening of a leaf spring so that the material which surrounds the opening snaps into the groove whereby the shaft is held in a predetermined axial position. The patentee proposes to employ a hammer as a means for expelling the shaft from the leaf spring in order to allow for extraction or expulsion of the connector from the internal space of the second member. The application of blows by a hammer is not a satisfactory solution of the problem of providing a removable connector, especially since the space which is available for the application of the hammer blows is very small so that the hammer is likely to damage the parts which are adjacent the opening in the leaf spring.

German Offenlegungsschrift No. 31 28 595 of Hackenberg discloses a modified connector wherein the shaft and the eccentric are movable axially against the opposition of a spring. This renders it possible to shift the eccentric and the shaft axially in the interior of the second member, either for the purpose of installing such parts in the second member or of permitting their extraction from the second member. The eccentric and the shaft are held against relative axial movement or are made of one piece. It has been found that the proposal of Hackenberg is not entirely satisfactory because the application of stresses to the eccentric can result in disengagement of the shaft from the second member.

German Pat. No. 22 39 370 to Swoboda discloses a connector wherein, in accordance with a first embodiment, the eccentric has an eccentric hole for the shaft and these parts are coupled to each other in such a way that the eccentric is compelled to share all angular movements of the shaft. The connector has two retaining members which are provided with jaws in the form of hooks both movable toward or away from each other in response to direct engagement with the eccentric which has portions extending through holes provided therefor in the retaining members. A cylindrical displacing member is provided to spread the jaws apart in response to retraction of the retaining members as a result of rotation of the eccentric. The just described connector operates satisfactorily as long as the wear upon the eccentrics and the adjoining portions of the retaining members is nil or relatively small.

In accordance with a modification, the connector of Swoboda comprises retaining members each of which carries a jaw at one end and a cam face at the other end. The eccentric serves to shift an intermediate part which bears against the cam faces in order to move the jaws away from each other. The retaining members act not unlike levers and can be pivoted only in response to the application of large forces. Moreover, the means for rotating the eccentric must overcome pronounced resistance which is attributable to friction. Therefore, this modified version of the connector of Swoboda is less popular than the first embodiment. An additional reason for this is that the pivotable retaining members are not mounted for retraction against the inner sides of the flanges on the profiled member so that the connection which is established between the profiled member and the second member is not as reliable as is necessary in the building and certain other industries.

Published British patent application No. 2 119 054 of Zoller describes a connector wherein two eccentrics are in direct motion transmitting engagement with retaining members which are provided with jaws for engagement with the flanges of a profiled member. A further eccentric is employed to indirectly move a spreading element against the retaining members for the purpose of moving the jaws away from each other. This connector is not reliable because of the direct motion transmitting engagement between the eccentrics and the retaining members so that the jaws are likely to remain out of contact with the inner or rear sides of the respective flanges. The movements of the retaining members resemble those of a connecting rod which is caused to perform composite movements by the crank of a crankshaft. Such movements are not ideally suited to ensure that the jaws will be advanced into and will thereupon remain in requisite engagement with the respective flanges of the profiled member.

German Utility Model No. 73 41 204 of Gebrueder Vieler discloses a reciprocable retaining member which can be displaced by an eccentric.

Published European patent application No. 0 059 463 of Mertens discloses a connector with an exposed eccentric. A barrier is reciprocable to and from a position adjacent one axial end of the eccentric so that the latter cannot be moved axially.

German Utility Model No. 19 70 271 of Jankowski discloses a connector wherein the retaining members for the jaws are biased by or constitute springs so as to urge the jaws away from each other and into positions of overlap with the respective flanges of a profiled member. The eccentric acts directly upon the retaining members.

OBJECTS AND SUMMARY OF THE INVENTION

An object of the invention is to provide a novel and improved connector which is less affected by wear than heretofore known connectors.

Another object of the invention is to provide a connector wherein the transmission of motion between the retaining members and the actuator therefor takes place in a novel and improved way.

A further object of the invention is to provide a connector which exhibits the advantages of heretofore known connectors but is simpler, longer-lasting and more reliable.

An additional object of the invention is to provide the connector with novel and improved means for causing the retaining member or members to perform composite movements in response to rotation of one or more eccentrics.

Still another object of the invention is to provide a connector wherein the retaining members can properly engage the flanges of a profiled member whose flanges extend toward or away from one another.

A further object of the invention is to provide the connector with novel and improved actuator means for the retaining members and their jaws.

An additional object of the invention is to provide a connector which can be used for separably coupling a wide variety of profiled and like members to one another with a force whose magnitude cannot change unless an authorized person desires to loosen or terminate the connection.

A further object of the invention is to provide a connector wherein the actuator means for the retaining member or members can be rotated in a novel and improved way.

An additional object of the invention is to provide a connector which can be readily installed in existing profiled and like structural members and which is constructed and assembled in such a way that its extraction or expulsion from the member in which the connector is installed need not involve the application of blows by a hammer or a like impacting tool.

A further object of the invention is to provide a connector which can be used to reliably couple heavy or lightweight beams, bars and like members and which can be reused as often as desired because the wear upon its parts does not immediately and appreciably affect the reliability of the connection which is established thereby.

Another object of the invention is to provide a novel and improved method of transmitting motion to retaining members of the above outlined connector in response to rotation of one or more eccentrics.

The invention is embodied in a connector which is used to separably secure at least one flange of a profiled member (e.g., an upright metallic beam) to a second member (e.g., a tubular horizontal bar or beam). The connector comprises retaining means including at least one retaining member which is movable between a first position of at least partial overlap with the one flange of the profiled member and a second position out of register with the one flange. The retaining member is further movable between an extended position out of contact with and a retracted position of engagement with the one flange. The connector further comprises a support, an actuator which is rotatably mounted in the support, displacing means for effecting a movement of the retaining member to the first position in response to rotation of the actuator, and motion transmitting means which is interposed between the actuator and the retaining member to effect a movement of the retaining member (in the first position of the retaining member, i.e., while the retaining member overlaps or overlies the one flange) to the retracted position in response to rotation of the actuator. Thus, rotation of the actuator will entail a movement of the retaining member from the second to the first position (through the medium of the displacing means) and a movement of the retaining member from the extended to the retracted position (through the medium of the motion transmitting means).

In accordance with a presently preferred embodiment of the connector, the actuator comprises eccentric means and the motion transmitting means comprises follower means tracking the eccentric means.

The connector further comprises means for rotating the actuator relative to the support, and such rotating means preferably comprises a shaft which is surrounded (at least in part) by the actuator and is in torque transmitting engagement therewith. The support is preferably provided with a hole for a portion of the shaft, and such connector preferably further comprises spring means for yieldably opposing expulsion of the aforementioned portion of the shaft from the hole of the support. The actuator can comprise at least one substantially disc-shaped eccentric, and the motion transmitting means can include a motion receiving portion (follower) cooperating with the eccentric.

The connector can be used to separably couple the profiled member to a hollow second member having an open front side adjacent the flange or flanges of the profiled member when the connector is in use. The support of such connector can include a housing for the actuator, displacing means and motion transmitting means, and the housing is insertable into and is removable from the hollow second member by way of the open front side. The housing can include a sidewall which is provided with the aforementioned hole for a portion of the shaft which forms part of or constitutes the means for rotating the actuator. The shaft further includes a coupling portion (e.g., a polygonal coupling portion) which is in torque transmitting engagement with the actuator. The second member is preferably formed with a hole which is in register with the hole of the sidewall of the housing and receives a part of the respective portion of the shaft.

The connector further comprises means for biasing the retaining member to the second position, and the shaft which serves to rotate the actuator preferably extends into an elongated slot of the biasing means with freedom of movement of the biasing means and retaining member between extended and retracted positions. The biasing means can comprise a substantially U-shaped spring having a web and two legs each of which is provided with a slot. The motion transmitting means is disposed between the legs of the U-shaped spring and is arranged to move the retaining member to the retracted position by way of the web. The web is remote from a hook-shaped or otherwise configurated jaw at the front end of the retaining member; such jaw engages the flange of the profiled member in the first position of the retaining member and while the latter is held in the retracted position.

If the profiled member comprises two flanges, the retaining means comprises two retaining members, i.e., one for each flange of the profiled member, and the motion transmitting means can but need not comprise two motion transmitting members, one for each retaining member. The actuator can comprise two disc-shaped eccentrics each of which is arranged to shift a different one of the two motion transmitting members and hence the respective retaining member. The eccentrics can be designed to surround the coupling portion of the shaft.

Each eccentric can extend into a window of the respective motion transmitting member, and such window is surrounded by an internal cam which is engaged by the eccentric. The width of the window can equal or approximate the diameter of the eccentric, and the length of the window can equal or approximate the sum of the diameter and the eccentricity or throw of the eccentric. Alternatively, and if there is room for multidirectional movements of the motion transmitting means, the latter can be provided with a circular window which snugly receives the eccentric of the actuator. In such connectors, the motion transmitting means is installed in the housing of the support with freedom of movement the extent of which at least equals the eccentricity of the eccentric.

The shaft of the means for rotating the actuator can comprise at least one cylindrical portion which is rotatably journalled in the aforementioned hole of the sidewall of the support and is adjacent the aforementioned coupling portion of the shaft. The coupling portion can extend radially beyond the cylindrical portion of the shaft. In accordance with a presently preferred embodiment of the means for rotating the actuator, the shaft has two coaxial cylindrical portions which flank the coupling portion. Alternatively, the means for rotating the actuator can comprise a splined shaft which is rotatably journalled in the support and a portion of which is received in a complementary coupling hole of the actuator so that the latter is compelled to share all angular movements of the shaft. It is also possible to provide the actuator and the shaft with complementary flats which ensure that the actuator must rotate with the shaft; the latter can be rotated by hand through the medium of a suitable tool or by a motor-driven tool. Still further, it is possible to employ an externally toothed shaft whose teeth mate with internal teeth of the actuator in such a way that the shaft and the actuator are movable axially relative to each other. If the coupling portion of the shaft has a polygonal cross-sectional outline, the actuator can have a polygonal hole which receives the polygonal coupling portion in such a way that the shaft and the actuator are movable axially relative to each other.

Means can be provided to hold the actuator and the shaft against axial movement relative to each other, at least while the connector is in actual use. If the coupling portion of the shaft has a polygonal cross-sectional outline, its facets can be disposed tangentially of the peripheral surface or surfaces of the aforementioned cylindrical portion(s) of the shaft. The biasing means of such connector is or can be formed with the aforementioned elongated slot or slots for the cylindrical portion or portions and at least one abutment (e.g., in the form of a corrugation) which serves to prevent axial movement of the shaft and the actuator relative to each other in one direction, at least in certain predetermined angular positions of the shaft with reference to the biasing means. The abutment is or can be in register with an edge which is defined by two neighboring facets of the coupling portion when the shaft assumes one of its predetermined angular positions.

One end portion of the shaft can be provided with an axially extending recess (e.g., a blind hole or bore), and the support can be provided with a sleeve which extends into the recess so that the one end portion of the shaft is properly journalled in the support. The other end portion of the shaft can be received in the aforementioned hole in one sidewall of the support opposite the sleeve, and the connector can comprise the aforementioned spring means which reacts against the second member and extends into the recess to oppose axial movements of the shaft in a direction to expel or withdraw its other end portion of the hole of the second member and/or of one sidewall of the support. As mentioned above, the housing of the support can be removably installed in the second member and the shaft can be mounted in the housing and in the second member with freedom of axial movement (against the opposition of the spring means) to an extent such that the other end portion of the shaft is disengaged from the second member so that the support can be withdrawn or expelled from the second member.

The displacing means can be provided with means for limiting the extent of rotation of the actuator with reference to the support. Such limiting means can comprise at least one lateral projection which is provided on the displacing means to be engaged by the front end of the motion transmitting means in response to rotation of the actuator in a predetermined direction. The rear end of the motion transmitting means can be used to move the retaining member or members to the retracted position(s) in response to rotation of the actuator counter to the predetermined direction or in response to continuing rotation of the actuator in the predetermined direction.

The arrangement may be such that at least one first eccentric of the actuator is designed to move the retaining member(s) to the first position(s) by way of the displacing means in response to rotation of the actuator from a predetermined angular position and in a predetermined direction, and that at least one additional eccentric is arranged to move the retaining member(s) to the retracted position(s) by way of the motion transmitting means in response to rotation of the actuator from the predetermined angular position and in the predetermined direction. The first and additional eccentrics are or can be angularly offset relative to each other so that the displacing means moves in a given direction and the motion transmitting means moves counter to the given direction in response to rotation of the actuator from the predetermined angular position and in the predetermined direction. The eccentricity or throw of the additional eccentric is preferably such that the displacing means is closely or immediately adjacent the flange or flanges of the profiled member in the retracted position(s) of the retaining member(s).

The eccentrics of the actuator are or can be rigid (e.g., integral) with one another. As mentioned above, at least one eccentric can be used to move the motion transmitting means and at least one additional eccentric can be provided to move the displacing means.

The displacing means can comprise a plurality of resilient sections which serve to apply to the retaining member(s) a force in a direction to move the retaining member(s) to the first position(s), and the magnitude of such force exceeds the bias of the means for biasing the retaining member(s) to the second position(s). The sections of the displacing means can comprise plates which define a gap, and at least one of the plates can have a convex side which is in abutment with the retaining member or with one of two retaining members. The convex side of the one plate can be provided with an elongated ridge which is parallel to the direction of preferably reciprocatory movement of the motion transmitting means in response to rotation of the actuator. In accordance with one presently preferred embodiment, the displacing means comprises three plate-like sections including two outer plates with convex outer sides and a median plate-like section. Each outer plate defines with the median plate a discrete gap having portions of different widths. The displacing means which comprises two or more plate-like sections can comprise a front portion formed by several discrete resilient lugs which are angularly offset relative to each other and relative to the major part of the displacing means in the second position(s) of the retaining member(s) but are substantially coplanar (as a result of elastic deformation) in the first position(s) of the retaining member(s).

The actuator of the improved connector can comprise at least one disc cam (as compared with an eccentric) having a lobe which is tracked by follower means provided on the motion transmitting means. The latter transmits motion to the retaining member(s) exclusively by way of the aforementioned resilient biasing means which urges the retaining member(s) to the second position(s). The disc cam has intermediate portions which flank the lobe and the combined width of such intermediate portions (as measured at right angles to the axis of rotation of the actuator) can equal the height of the internal space of the housing and/or the height of the motion transmitting means (as measured at right angles to the direction of movement of the retaining member(s) between extended and retracted position(s). The cam can further comprise a convex portion which is adjacent the lobe and has its center of curvature on the axis of the actuator (i.e., the throw of the convex portion is zero). The convex portion of the cam can engage a concave portion which is adjacent the convex portion during the initial stage of rotation of the actuator from a predetermined starting position toward engagement of the lobe with the motion transmitting means in order to retract the retaining member(s) by way of the biasing means. The outline of the concave portion can be such that the motion transmitting means is not shifted by the rotating cam during engagement of the concave portion with the lobe. The motion transmitting means of such connector preferably further comprises a follower portion which is adjacent the concave portion and serves to effect a shifting of the motion transmitting means in response to engagement by the lobe. The cam can comprise a projection which is spaced apart from the axis of rotation of the actuator to be tracked by a follower portion of the displacing means in order to effect a movement of the retaining member(s) to the first position in response to rotation of the actuator. The follower portion of the displacing means can be provided with a substantially straight face which is engaged by the projection of the disc cam and intersects the path of movement of the projection about the axis of rotation of the actuator. The orientation of the follower portion is such that the displacing means is shifted by the projection of the disc cam before the lobe shifts the motion transmitting means in response to rotation of the actuator from a predetermined angular position.

The housing of the support can be substantially U-shaped. The means for biasing the retaining member(s) to the second position(s) and the spring element for urging the retaining member(s) to the extended position(s) are mounted in the housing. The actuator and the shaft, together with the retaining, motion transmitting, biasing and displacing means, can be removed or expelled from the interior of the second member by way of the open front end of the second member when the aforementioned spring mean is caused to store energy so as to permit the shaft to become disengaged from the second member.

Alternatively, the housing of the support can comprise two spaced-apart sidewalls and a rear end wall as well as one or more additional walls between the sidewalls intermediate the open front end of the housing and the rear end wall. Each additional wall can be integral with at least one of the two sidewalls.

The improved connector can be used with equal or similar advantage for separably coupling the second member to a profiled member wherein two flanges of the profiled member extend away from each other, i.e., wherein the two flanges have free edges facing away from each other. The retaining means then preferably comprises pincers with two retaining members having confronting jaws each engageable with a different one of the two flanges. The biasing means is then designed to bias the retaining members and their jaws apart (to the second positions) and the motion transmitting means can comprise a common (single) motion transmitting member for the two retaining members. Once the flanges are disposed between the retaining members, the jaws of such retaining members can be moved by the displacing means to overlie the respective flanges before the retaining members are moved to retracted positions by the motion transmitting means. The displacing means of such connector is designed to move the retaining members to their first positions by moving their jaws toward each other. The displacing means can comprise two displacing members which are installed in the housing of the support, and the biasing means can comprise two biasing members which are disposed between the displacing members each adjacent a different one of the displacing members. The biasing members have cam faces which are engaged by the respective displacing members to move the retaining members and their jaws to the first positions in response to rotation of the actuator from a predetermined angular position. The displacing members can be moved by two discrete eccentrics of the actuator to move the biasing members in a predetermined direction while the motion transmitting means moves the biasing members and the actuating members to retracted positions counter to the predetermined direction.

The displacing means can comprise a locking bolt which is reciprocable by the actuator and has a substantially wedge-like portion which is designed to move between and to thereby move the retaining members of the retaining means to their first positions upon insertion of the locking bolt and of portions of the retaining members into the aperture between two confronting flanges of the profiled member and in response to rotation of the actuator. The locking bolt can comprise a frame which surrounds an opening or the retaining members and the wedge-like portion of the frame faces the opening. The biasing means of such connector can be provided with a second wedge-like portion which is disposed in the opening of the frame opposite the wedge-like portion of the locking bolt. The retaining members of this connector have flanks which are adjacent and complementary to the wedge-like portions. The actuator is designed to move one of the wedge-like portions toward the other wedge-like portion and to thereby move the retaining members away from one another to their first positions in response to rotation of the actuator from a predetermined angular position. The motion transmitting means of the just described connector can be interposed between the actuator and the locking bolt which is disposed in the housing of the support. The biasing means can comprise prongs or tongues which bias the retaining members to their second positions. Each retaining member is disposed between the second wedge-like portion and one of the prongs. The biasing means can comprise a substantially roof-shaped part which constitutes the second wedge-like portion, and the connector can comprise spring means for urging the one wedge-like portion away from the other wedge-like portion. The spring means can form an integral part of the biasing means. The retaining members are or can be mirror symmetrical to each other and can be at least partially confined in the opening of the frame which forms part of the locking bolt (displacing means) when the retaining members assume their second positions. The width of the locking bolt can match or approximate the width of the aperture between two confronting flanges of the profiled member.

The locking bolt can comprise a frame-like band of spring steel or the like and the wedge-like portion of the locking bolt is disposed within the confines of the band opposite the motion transmitting means. The actuator is disposed between the wedge-like portion of the locking bolt and the wedge-like portion of the biasing means on the one hand and the motion transmitting means on the other hand. The end portions of the band can be anchored in the motion transmitting means, preferably in a slot of the motion transmitting means which is remote from the actuator.

The retaining members can define a chamber for the wedge-like portion of the locking bolt, and the means for biasing the retaining members of such connector to second positions can form an integral part of the support.

The motion transmitting means can comprise two rigidly interconnected motion transmitting members, and the actuator can comprise two substantially disc-shaped eccentrics or cams and means for connecting the eccentrics or cams to each other. The connecting means (which can comprise a pin having portions extending into holes provided therefor in the eccentrics or cams) can serve to move the displacing means relative to the retaining member(s) in response to rotation of the actuator.

The novel features which are considered as characteristic of the invention are set forth in particular in the appended claims. The improved connector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of a first connector which embodies the invention and wherein the actuator has two eccentrics, one for each arm of a yoke-like biasing device for the retaining members which carry jaws serving to engage two confronting flanges of a profiled member in order to separably couple the latter to a second member which is shown partially broken away and is about to be coupled to the profiled member;

FIG. 2 is a fragmentary perspective view of a modified connector wherein the jaws of the retaining members are disposed at different levels;

FIG. 3 is an enlarged central longitudinal vertical sectional view of the first connector as seen in the direction of arrows from the line III—III of FIG. 5, with the retaining members and their jaws in extended positions;

FIG. 4 shows the structure of FIG. 3 as seen in the direction of arrows from the line IV—IV of FIG. 6, with the retaining members and their jaws in retracted positions;

FIG. 5 is a fragmentary plan view of the profiled member and a horizontal sectional view of the first connector and of the second member, with the retaining members shown in their second positions during introduction into the aperture between the confronting the profiled member;

FIG 6 shows the structure of FIG. 5 but with the retaining members in first as well as in retracted positions in which the jaws engage the inner sides of the respective flanges;

FIG. 11 is a horizontal sectional view of a third connector wherein the actuator comprises two eccentrics in the form of disc cams for the motion transmitting members which serve to shift the retaining members to the retracted positions, the jaws of the retaining members being shown in positions of engagement with the inner sides of the respective flanges forming part of the profiled member;

FIG. 12 is an enlarged longitudinal vertical sectional view of the connector of FIG. 11, showing one of the disc cams in a first angular position corresponding to extended positions of the retaining members and of their jaws;

FIG. 13 shows the structure of FIG. 12, with the one disc cam in a different angular position and the retaining members substantially midway between their extended and retracted positions;

FIG. 14 shows the structure of FIG. 12 or 13 with the retaining members in fully retracted positions;

FIG. 15 is a perspective view of a fourth connector wherein the housing comprises a tube having an open front end, a closed- rear end and four sidewalls;

FIG. 16 is a perspective view of a fifth connector which constitutes a modification of the connector of FIG. 15 and wherein two sidewalls of the housing comprise pairs of coplanar plate-like portions;

FIG. 17 is a perspective view of a sixth connector wherein the displacing means comprises resilient legs which are coplanar in the first positions of the retaining members, portions of one of the retaining members and of the housing being broken away;

FIG. 18 is a perspective view of a seventh connector wherein the displacing means is assembled of several substantially plate-like resilient sections two of which have convex outer sides;

FIG. 19 is a horizontal sectional view of the connector of FIG. 18 and of the two members which are coupled to each other by the connector, the jaws of the retaining members being shown in their first and retracted positions in which the open front side of the second member bears against the flanged profiled member;

FIG. 20 is a perspective view of an eighth connector and a fragmentary perspective view of the profiled and second members, the displacing means of the connector having a rectangular locking bolt with a wedge-like portion which can spread the jaws of the retaining members apart inorder to move these jaws to their first positions;

FIG. 21 is a perspective view of a ninth connector which constitutes a modification of the connector of FIG. 20 in that the rigid frame-like locking bolt is replaced by a locking bolt which employs a tensioning band to reduce the height and bulk of the displacing means;

FIG. 28 is an exploded perspective view similar to that of FIG. 20 but showing a tenth connector with displacing means using a different locking bolt;

FIG. 32 is an exploded perspective view similar to that of FIG. 20 or 28 but showing an eleventh connector with retaining members whose jaws can engage a pair of flanges which extend away from each other;

FIG. 33 is a longitudinal vertical sectional view of the connector of FIG. 32 as seen in the direction of arrows from the line XXXIII—XXXIII of FIG. 35, showing the retaining members and their jaws in extended positions;

FIG. 34 is a vertical sectional view of a portion of the structure of FIG. 33 but showing the actuator and the rotating means therefor in a different angular position;

FIG. 35 is a horizontal sectional view of the connector of FIGS. 32-34, with the retaining members and their jaws shown in extended positions; and FIG. 36 is a view similar to that of FIG. 35 but showing the retaining members and their jaws in extended positions.

DESCRIPTION OF THE PREFERRED EMBODIMENTS

Figure 7:
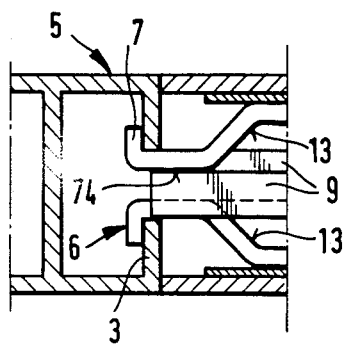
FIG. 7 is a fragmentary plan view of the profiled member and of the second connector of FIG. 2 and a fragmentary horizontal sectional view of the second member, with the jaws of the retaining members in engagement with the respective flanges.

Similar reference characters are employed in all Figures to denote similar, identical or analogous parts. Referring first to the embodiment of FIGS. 1, 3-6, 9 and 10, there is shown a connector 1 which serves to separably couple an upright profiled member 5 with a horizontal second member or cross member 2. The second member 2 is hollow and has an open front side 22 which is adjacent two confronting coplanar flanges 3 of the profiled member 5 when the connector 1 is in actual use. In the embodiments of FIGS. 1 through 31, the flanges 3 of the profiled member 5 face each other and define an upright slot-shaped aperture 47. The embodiment of the connector which is shown in FIGS. 32-36 is used to separably couple the hollow second or cross member 2 with an upright profiled member 5 having two external flanges 4 the free vertical edges of which are remote from each other and from a web which carries the flanges and is preferably integral therewith. The flanges 3 of FIGS. 1-31 and the flanges 4 of FIGS. 32-36 can be said to constitute undercut portions of the respective profiled members 5. It will be appreciated that the illustrated profiled members 5 constitute but two of numerous types of profiled members which can be coupled to additional or second members (such as the members 2) by resorting to the improved connector 1.

Referring more specifically to the embodiment of FIGS. 1, 3-6 and 9-10, the connector 1 comprises retaining means having at least two mirror symmetrical retaining members or arms 6 each of which has a front end portion constituting a hook-shaped jaw or claw 7. The purpose of the jaws 7 is to engage the inner sides of the respective flanges 3 when the connector 1 is operative and to thereby urge the open front side 22 of the second member 2 against the adjacent vertical surface of the profiled member 5 without permitting any wobbling of the members 2 and 5 relative to each other. The configuration of the jaws 7 at the front ends of the retaining members 6 can deviate from the configurations which are shown in FIGS. 1, 3 to 6 and 9-10 without departing from the spirit of the invention. All that counts is to provide the retaining members 6 with jaws, claws or similar front end portions which can be caused to overlap the respective flanges 3 and to thereupon engage the inner sides of such flanges when the connector 1 is in use. In the first embodiment, the free end portions 8 of the jaws 7 are adjacent the outer sides of the respective retaining members 6 because the profiled member 5 has two confronting flanges 3. The free end portions 8 of the jaws 7 of the retaining members 6 which are shown in FIGS. 32-36 are disposed at the inner sides of the respective retaining members because the free edges of the flanges 4 on the profiled member 5 of FIGS. 32-36 are remote from each other.

FIGS. 1, 3 and 5 show the retainig members 6 and their jaws 7 in second positions in which the jaws 7 are sufficiently close to each other to be capable of passing through the aperture 47 of the profiled member 5. FIGS. 4 and 6 show the jaws 7 and the respective retaining members in first positions in which the free end portions 8 of the jaws 7 overlie the inner sides of the respective flanges 3 so that the retaining members 6 cannot be extracted from the aperture 47 of the profiled member 5. Furthermore, FIGS. 1, 3 and 5 show the retaining members 6 and their jaws 7 in extended positions in which the jaws 7 extend well beyond the open front end 22 of the hollow second member 2. FIGS. 4 and 6 show the retaining members 6 and their jaws 7 in retracted positions (shifted to the right, as compared with the extended positions shown in FIG. 5) in which the free end portions 8 of the jaws 7 engage the inner sides of the respective flanges 3 and hold the second member 2 against movement relative to the profiled member 5.

In the embodiment of FIGS. 1, 3-6 and 9-10, the retaining members 6 are mirror symmetrical to each other with reference to a vertical plane which is disposed midway between the two parallel sidewalls 24 of a housing or support 21 forming part of the connector 1. However, it is equally possible to provide two modified retaining members one of which need not move toward or away from the other retaining member while the other retaining member is pivotable or otherwise movable relative to the stationary retaining member. In the first embodiment of the connector 1, the retaining members 6 are movable through the same distances during advancement from the second positions of FIG. 5 to the first positions of FIG. 6 or vice versa. Such movements are effected by a displacing means 9, and the retaining members 6 are pivotable about vertical axes which are adjacent the respective ends of a rear end wall or web 28 forming part of U-shaped biasing means 12 for the retaining members 6. The purpose of the biasing means 12 (which can constitute a leaf spring made of spring steel) is to permanently urge the retaining members 6 and their jaws 7 to the second positions of FIG. 5. The displacing means 9 can be shifted by a novel actuator 10 in order to move the retaining members 6 and the corresponding jaws 7 from the second positions of FIG. 5 to the first positions of FIG. 6 against the opposition of the respective legs 26 of the resilient biasing means 12. The displacing means 9 further serves to lock the retaining members 6 and the corresponding jaws 7 in the first positions of FIGS. 6 when the connector 1 is in actual use, i.e., when the connector 1 is called upon to establish a reliable and wobble-free connection between the profiled member 5 and the hollow second member 2.

The actuator 10 is rotatable about a horizontal axis 11 which is defined by a removable rotating means including a horizontal stud or shaft 18. The axis 11 extends at right angles to the direction of reciprocatory movement of the retaining members 6 between the extended positions of FIG. 5 and the retracted positions of FIG. 6. The biasing means 12 automatically moves the jaws 7 of the retaining members 6 into register with the aperture 47 of the profiled member 5 when the displacing means 9 allows for a movement of the jaws 7 toward each other. The inner sides of the retaining members 6 have suitably inclined cam faces 13 which are engaged by the front portion of the displacing means 9 to pivot the retaining members 6 from the second positions of FIG. 5 to the first positions of FIG. 6 as soon as the actuator 10 causes a relative movement between the retaining members 6 and the displacing means 9 in a sense to enable the displacing means 9 to overcome the resistance of the resilient biasing means 12. The arrangement is preferably such that the movements of the retaining members 6 from the second positions of FIG. 5 to the first positions of FIG. 6 takes place simultaneously with or immediately before a movement of the retaining members 6 from the extended positions of FIG. 5 to the retracted positions of FIG. 6. The just discussed feature is common to all illustrated embodiments of the connector 1, i.e., a rotation of the actuator 10 will entail a movement of the jaws 7 toward their positions of overlap with the respective flanges 3 or 4 as well as a retraction of the jaws toward the interior of the housing or support 21 with simultaneous engagement of the free end portions 8 of the jaws 7 with the inner sides of the respective flanges 3 or 4. In the embodiments of FIGS. 1-31, the cam faces 13 are provided at the inner sides of the respective retaining members 6 because such retaining members flank at least a portion of the displacing means 9. On the other hand, the retaining members 6 of the connector 1 which is shown in FIGS. 32 to 36 hve cam faces 13 at their outer sides because the two-piece displacing means 9 is designed to move the jaws 7 toward each other in order to move such jaws to positions of overlap with the inner sides of the respective flanges 4. In other words, while the embodiments of FIGS. 1 to 31 employ retaining members 6 whose jaws 7 must move apart in order to assume their respective first positions, the connector 1 of FIGS. 32, 36 is designed in such a way that the jaws 7 are nearer to each other when they assume the respective first positions. The retaining members 6 and the jaws 7 of the embodiment which is shown in FIGS. 32-36 can be said to constitute the legs or arms of pincers which clamp the external flanges 4 when the respective connector 1 is in actual use. The aforedescribed composite movements of the retaining members 6 between extended and retracted positions (simultaneously with or following their movements between second and first positions) have been found to bring about a reliable coupling of the members 2 and 5 to each other. The retaining or coupling action is highly satisfactory and the force with which the connector 1 urges the second member 2 against the adjacent side of the profiled member 5 is very pronounced. Moreover, and since the extent of movement from the extended to the retracted positions of the retaining members 6 can be varied, the connector 1 can readily compensate for eventual wear upon its component parts as well as upon portions of the members 2 and 5.

Another feature which is common to all embodiments of the improved connector 1 is that the actuator 10 does not directly engage the retaining members 6; instead, the connector 1 comprises a motion transmitting means 14 which is interposed between the actuator 10 and the retaining members 6 and serves to move the retaining members 6 from the extended positions (FIG. 5) to the retracted positions (such as those shown in FIG. 6). This reduces the wear upon the retaining members 6 and ensures a longer useful life of the entire connector 1. It has been found that such connector can accurately couple the members 2 and 5 to each other even after numerous uses and after long intervals of continuous or interrupted use. The motion transmitting means 14 has motion receiving cam means 15 constituting followers for two eccentrics of the rotary actuator 10. FIGS. 3 and 4 show rectangular follower means 15 for the disc-shaped eccentrics of the actuator 10. However (and as will be described hereinafter), it is also possible to provide the motion transmitting means 14 with differently configurated follower means without departing from the spirit of the invention. The actuator 10 has a coupling hole 16 which non-rotatably surrounds the polygonal (e.g., hexagonal or octagonal) coupling portion 17 of the shaft 18. The coupling hole 16 is eccentric with reference to the rectangular motion receiving follower means 15 of the motion transmitting means 14. The provision of motion transmitting means 14 ensures that the disc-shaped eccentrics of the actuator 10 need not directly engage the retaining members 6 and/or the biasing means 12 for the retaining members. Such direct engagement could result in undue deformation of and premature wear upon the eccentrics of the actuator 10 and the retaining members 6 and would entail unpredictable coupling of the members 2 and 5 to each other.

The connection between the actuator 10 and the shaft 18, which is confined therein, is such that these parts are movable axially relative to each other. In the embodiment of FIGS. 1, 3-6 and 9-10, the actuator 10 has two eccentrics in the form of discs each of which is in engagement with one piece or member of the two-piece motion transmitting means 14. The configuration of the surfaces bounding the coupling hole 16 of the actuator 10 is such that the shaft 18 is compelled to rotate the actuator when it is set in rotary motion in a direction to move the retaining members 6 from the second to the first positions as well as to move such retaining members from the extended to the retracted positions. The connection between the actuator 10 and the shaft 8 is a so-called form-locking connection. The shaft 18 can be shifted axially relative to the actuator 10 while the latter remains in proper torque-transmitting engagement with the motion transmitting means 14.

The tip 19 of one of two cylindrical portions 31 of the shaft 18 is received in concentric circular holes 20 of one sidewall 24 of the housing or support 1 and the adjacent wall of the casing 23 of the second member 2. This can be readily seen in FIGS. 1, 5 and 6. The second member 2 has a hollow casing 23 which receives the housing 21 when the connector 1 is properly installed in the second member. As can be seen in FIG. 6, the tip 19 of the one cylindrical portion 31 of the shaft 18 has a polygonal recess or socket 25 for the working end of a suitable manually operated or motor-driven tool (not shown) which is used to move the retaining members 6 between their extended and retracted positions with attendant automatic movements of the jaws 7 of such retaining members between their first and second positions. Furthermore, the shaft 18 is movable axially (upwardly, as seen in FIG. 6) against the opposition of a coil spring 39 which is installed in an axial recess 37 provided in the other cylindrical portion 31 of the shaft 18. The recess 37 receives a hollow cylindrical sleeve-like portion 38 of the respective sidewall 24 of the housing 21. When the spring 39 is free to expand and to maintain the other cylindrical portion 31 in the holes 20 of the casing 23 and housing 21, the shaft 18 is properly mounted in the second member 2. In order to allow for an extraction or expulsion of the connector 1 from the second member 2, it is necessary to shift the shaft 18 axially against the opposition of the spring 39 until the lower cylindrical portion 31 of FIG. 6 is disengaged from the casing 23 as well as from the support or housing 21. At such time, the housing 21 can be shifted in a direction to the left, as seen in FIG. 6, in order to move it out of the casing 23 through the open front end of the second member 2. Reinsertion of the connector 1 is effected by reversing the sequence of the just described steps. Thus, the shaft 18 is shifted axially against the opposition of the spring 39 so as to render it possible to reintroduce the housing 21 through the open front side of the casing 23, and one cylindrical portion 31 of the shaft 18 automatically snaps into the hole 20 of the casing 23 as soon as the hole 20 of the housing 21 is returned to a position of register with the hole of the casing 23, i.e., as soon as the housing 21 is returned to the position which is shown in FIGS. 5 and 6. The arrangement is preferably such that the lower cylindrical portion 31 of the shaft 18 (as seen in FIG. 5 or 6) has an end face which is flush with the underside of the casing 23 when the housing 21 is properly inserted into the second member 2.

The housing 21 confines the retaining members 6, the biasing means 12 (the legs 26 of which are integral with the respective retaining members 6), the displacing means 9, the actuator 10, as well as the motion transmitting means 14. Only the jaws 7 and the adjacent portions of the retaining members 6 extend forwardly beyond the open front end 22 of the housing 21. The legs 26 of the biasing means 12 have elongated slots 27 (see particularly FIG. 9) which enable the motion transmitting means 14 to move longitudinally (at right angles to the axis 11) in order to cause the biasing means 12 and the retaining members 6 (with the jaws 7) to move between the extended and retracted positions. A leaf spring 29 which is integral with the rear end wall of the housing 21 serves as a means for yieldably urging the biasing means 12, the retaining members 6 and their jaws 7 to the extended positions which are shown in FIGS. 3 and 5. The leaf spring 29 need not necessarily be an integral part of the housing 21. However, such design is preferred at this time because it simplifies the construction of the connector 1. The free end portion of the leaf spring 29 bears against the outer side of the rear end wall or web 28 of the biasing means 12. This can be readily seen in FIGS. 3 and 4. The length of the slots 27 in the legs 26 of the biasing means 12 determines the extent of movability of the motion transmitting means 14 and biasing means 12 relative to the housing 21 in directions toward and away from the open front side of the casing 23 of the second member 2. The provision of biasing means 12, the legs 26 of which are integral with the respective retaining members 6, is preferred at this time because this simplifies the construction of the connector 1 and ensures adequate distribution of stresses to both halves of the composite retaining and biasing means 6 and 12. The provision of biasing and retaining means 12 and 6 having two mirror symmetrical halves (with reference to a plane which is normal to the axis 11) is desirable and advantageous because this ensures a more predictable distribution of forces which develop when the connector 1 is actuated as well as when the connector is in actual use.

In the embodiments which are shown in FIGS. 1 to 31, the displacing means 9 acts as a spreader or expander and is mounted on the coupling portion 17 of the shaft 18 within the actuator 10. The actuator 10 has two disc-shaped eccentrics which flank the displacing means 9 and surround the respective end regions of the coupling portion 17. Each of the eccentrics acts upon the respective member of the motion transmitting means 14. The arrangement is preferably such that the two eccentrics of the actuator 10 are identical and are in exact axial alignment with each other so that the two members of the motion transmitting means 14 are invariably moved as a unit and through identical distances.

Each member of the motion transmitting means 14 has a rectangular window 30 which is bounded by the aforementioned motion receiving follower means 15 of the respective motion transmitting member. As can be seen in FIGS. 3 and 4, the width of each window 30 (as measured in the direction of reciprocatory movement of the motion transmitting means 14) equals or approximates the diameter of a disc-shaped eccentric of the actuator 10. The length of each window 30 equals or approximates the sum of the diameter of an eccentric plus the eccentricity or throw of such eccentric. This ensures that the motion transmitting means 14 will perform pure reciprocatory movements in response to rotation of the shaft 18 and of the actuator 10 in directions to effect a movement of the biasing means 12 and of the retaining members 6 between the extended positions of FIG. 5 and the retracted positions of FIG. 6.

The motion transmitting means 14 with rectangular windows 30 can be replaced by motion transmitting means having circular windows with diameters matching those of the eccentrics on the actuator 10. The motion transmitting means 14 is then received in the housing 21 with a certain play (as considered vertically in FIG. 3 or 4 which at least equals or approximates twice the eccentricity or throw of the eccentrics forming part of the actuator 10.

The coupling portions 17 of the shaft 18 has 6 facets 32 which impart to hhe portion 17 a hexagonal profile 33. The facets 32 are substantially tangential to the peripheral surfaces 38 of adjacent cylindrical portions 31 of the shaft 18. Alternatively, the shaft 18 could be replaced with a splined shaft and the actuator 10 would then have an axial passage with a surface complementary to that of the peripheral surface of the splined shaft so as to ensure that the actuator will share all angular movements of the splined shaft but will be free to move axially relative thereto. Still further, the coupling portion 17 can be replaced with a cylindrical portion having at least one flat which abuts a complementary flat of the internal surface of the actuator 10 to again ensure that the actuator and the shaft will rotate as a unit but will be movable axially relative to each other in order to allow for withdrawal of the connector 1 from the interior of the hollow second member 2 and/or for reinsertion of such connector. Still further, the coupling portion 17 can be replaced with a coupling portion having a set of external teeth mating with internal teeth of the actuator 10. All that counts is to ensure that the actuator 10 and the shaft 18 will rotate as a unit but will be capable of performing axial movements relative to each other.

Figure 9:
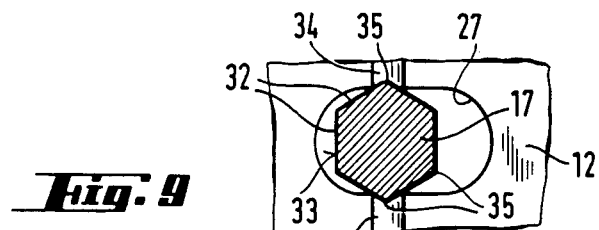
FIG. 9 is a fragmentary vertical sectional view of the shaft which is used to rotate the actuator and of biasing means for the retaining members, the biasing means having an abutment which prevents axial movements of the shaft when the connector is operative to couple a flanged profiled member with a second-member.
Figure 10:
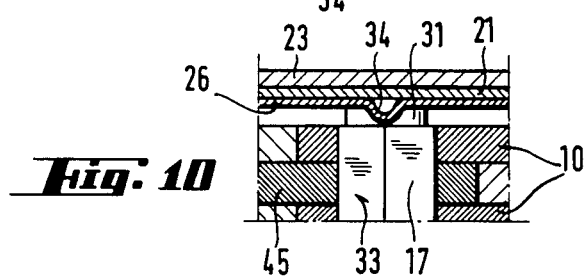
FIG. 10 is a plan view of the shaft and a fragmentary horizontal sectional view of the resilient biasing means of FIG. 9, further showing certain additional details of the connector which is of the type shown in FIG. 8.

The coupling portion 17 can further serve as a means for preventing axial movements of the shaft 18 relative to the actuator 10 when the connector 1 is in actual use, namely when the jaws 7 of the retaining members 6 are caused to bear against the inner or rear sides of the respective flanges 3 or 4. This enhances the safety and reliability of the connector 1 because the connector cannot be accidentally disengaged from the profiled member 5. As shown in FIGS. 9 and 10, the facets 32 define axially parallel edges 35 at least one of which abuts against stops 34 which are provided on one of the legs 26 forming part of the biasing means 12. The stops 34 can constitute two portions of a corrugation of the respective leg 26 and extend inwardly along the surface 38 of the respective cylindrical portion 31 of the shaft 18. In the embodiment of FIGS. 9 and 10, the two abutments or stops 34 in the form of two coplanar portions of a corrugation extend inwardly beyond the inner side of the major portion of the respective leg 26. When the shaft 18 assumes the angular position which is shown in FIGS. 9 and 10, two shoulders adjacent the respective edges 35 abut the stops 34 so that the shaft 18 cannot be shifted upwardly, as seen in FIG. 6, namely against the opposition of the coil spring 39. This ensures that, at such time, the shaft 18 is locked or blocked in the axial position of FIG. 6 and cannot be expelled from the registering holes 20 of the casing 23 and housing 21. The two stops 34 of FIG. 9 constitute two portions of a single corrugation which is provided in the biasing means 12 and is interrupted in the region of the respective elongated slot 17 for the corresponding cylindrical portion 31 of the shaft. The shaft 18 can assume several first angular positions in each of which the two portions 34 of the corrugation cooperate with adjacent edges 35 of the coupling portion 17 to hold the shaft 18 against axial movement relative to the actuator 10, and several second angular positions in which the edges 35 do not interfere with axial movement of the shaft 18 against the opposition of the spring 39 in the axial recess 37 of the respective cylindrical portion 31 of the shaft. As shown in FIG. 6, the coil spring 39 reacts against the casing 23 and bears against the surface in the deepmost portion of the recess 37. The arrangement is such that the shaft 18 assumes the angular position of FIGS. 9 or 10 when the movement of the retaining members 6 to the retracted positions of FIGS. 4 and 6 is completed, i.e., when the open or free ends 8 of the jaws 7 engage the inner sides of the respective flanges 3.

It has been found that, due to the self-locking action of the eccentrics forming part of the actuator 10 and the relatively large friction forces which develop at such time, the jaws 7 are biased against the inner sides of the flanges 3 with a force which ensures that the connector 1 cannot be accidentally disengaged from the profiled member 5. In other words, it is necessary to resort to a suitable tool (the working end of which must enter the socket 25 in one cylindrical portion 31 of the shaft 18) and to rotate such tool together with the shaft 18 and actuator 10 in order to move the biasing means 12, the retaining members 6 and the jaws 7 from the retracted positions of FIGS. 4 and 6 to the extended positions of FIGS. 3 and 5 before the members 2 and 5 can be separated or disengaged from each other. The forces which are applied when the connector 1 is in actual use are distributed to large portions of the surfaces of the biasing means 12 through the medium of the eccentrics of the actuator 10. This is desirable because it ensures a reliable operation of the connector 1. Furthermore, rotation of the actuator 10 by the shaft 18 does not result in any frictional rubbing contact of the actuator with the biasing means 12, retaining members 6 and jaws 7 but only in relative movement of the eccentrics of the actuator 10 and motion transmitting means 14. This cannot immediately affect the accuracy of the coupling action and ensures that the connector 1 can properly couple the members 2 and 5 after frequent engagement of the jaws 7 with and frequent disengagement of the jaws from the respective flanges 3 or 4. The connector 1 can properly couple the member 2 with the member 5 after a large number of repeated actuations, i.e., after a large number of successive rotations of the actuator 10 in directions to move the retaining members 6 from extended to retracted positions and vice versa.

In addition, the connector 1 can be readily installed in, and again extracted or expelled from, the hollow casing 23 of the second member 2. As mentioned above, all that is necessary is to change the angular position of the shaft 18 from that which is shown in FIGS. 9 and 10 to that which is shown in FIG. 3 so as to ensure that the stops 34 do not interfere with axial movement of the shaft 18 against the opposition of the coil spring 39. The shaft 18 can be shifted by the working end of a tool which is inserted into the socket 25 or is caused to simply bear against the end face of the tip 19 of the respective cylindrical portion 31 shown in FIG. 1 so as to depress the shaft 18 upwardly, as seen in FIG. 6, whereby the lower cylindrical portion 31 of the shaft leaves the registering holes 20 of the casing 23 and housing 21 while the shaft continues to be adequately guided by the sleeve 38 of the housing 21. Once the shaft 18 is expelled from the holes 20, the entire housing 21 can be shifted toward and through the open front side of the casing 23.

The depth of the recess 37 should suffice to ensure that the sleeve 38 of the housing 21 will not strike against the surface at the bottom of the recess 37 before the remote cylindrical portion 31 of the shaft 18 is fully expelled from the hole 20 of the casing 23. An expulsion of the cylindrical portion 31 from the hole 20 of the housing 21 is not necessary since the housing 21 and the shaft 18 can move as a unit toward the open front side of the casing 23. One of those angular positions of the shaft 18 in which the edges 35 between the facets 32 of the coupling portion 17 do not oppose an axial displacement of the shaft 18 relative to the casing 23, housing 21 and biasing means 12 is shown in FIGS. 3 and 5.

Figure 24:
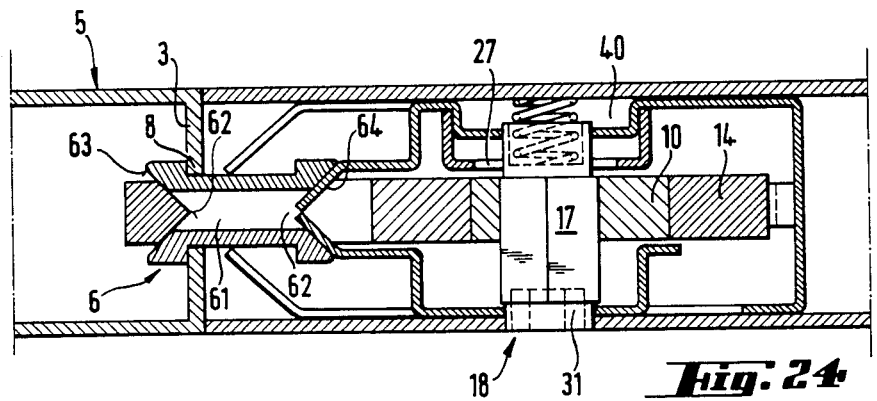
FIG. 24 is a view corresponding to that shown in FIG. 23 but with the retaining members in retracted positions.
Figure 25:
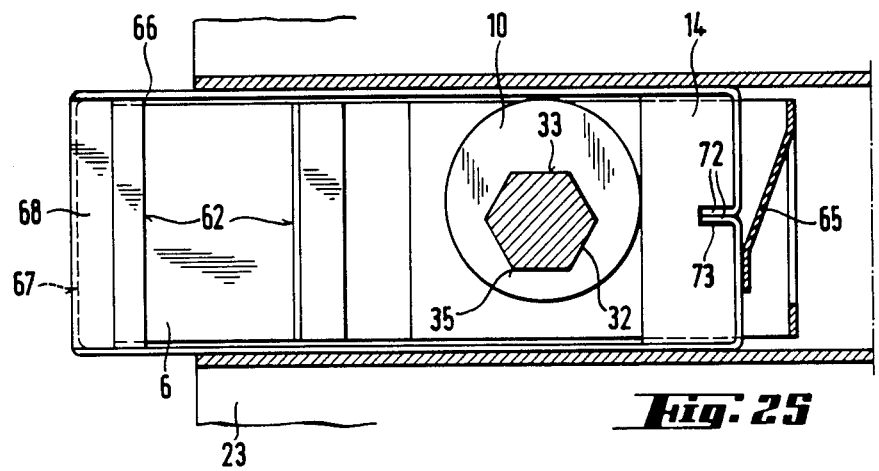
FIG. 25 is a longitudinal vertical sectional view of the connector of FIG. 21, with the retaining members shown in extended positions.
Figure 26:
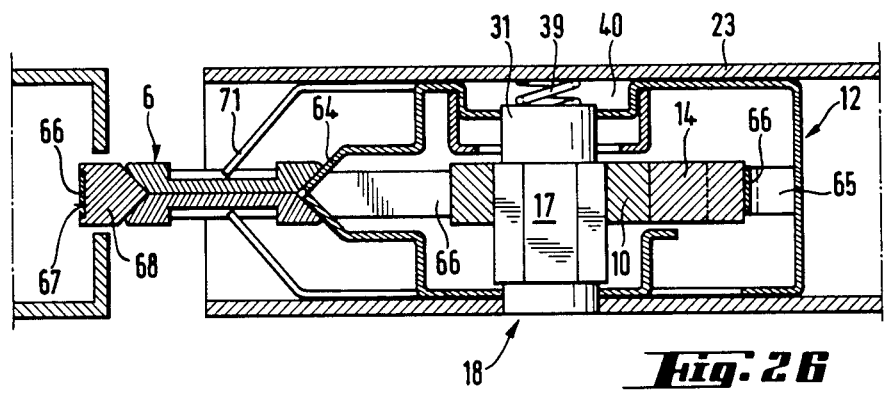
FIG. 26 is a horizontal sectional view of the connector of FIGS. 21 and 25, with the retaining members shown in extended positions.
Figure 27:
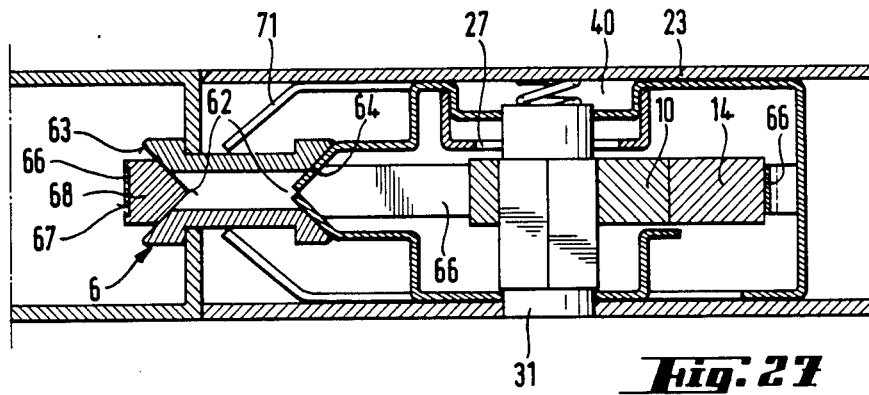
FIG. 27 is a horizontal sectional view of the connector of FIGS. 21 and 25-26 but with the retaining members shown in their retracted positions.
Figure 29:
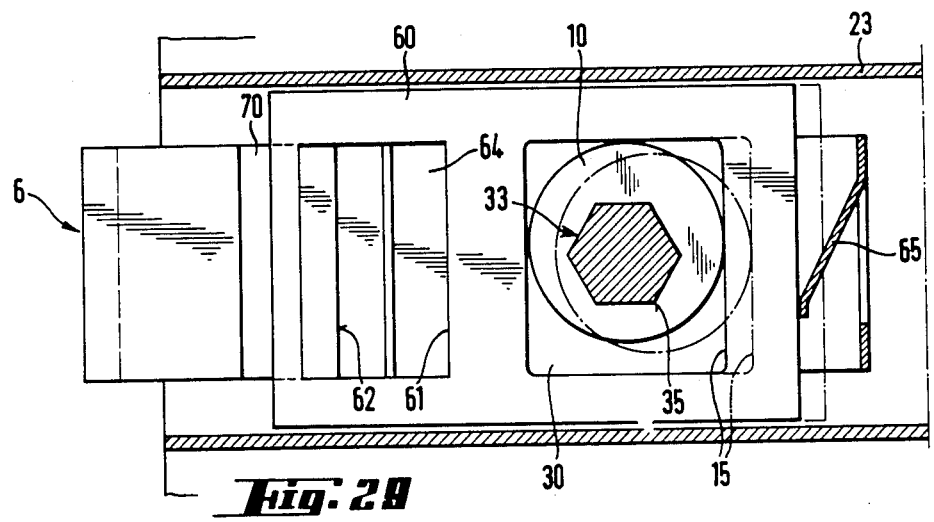
FIG. 29 is a longitudinal vertical sectional view of the connectr of FIG. 28, showing the retaining members in their extended positions.
Figure 30:
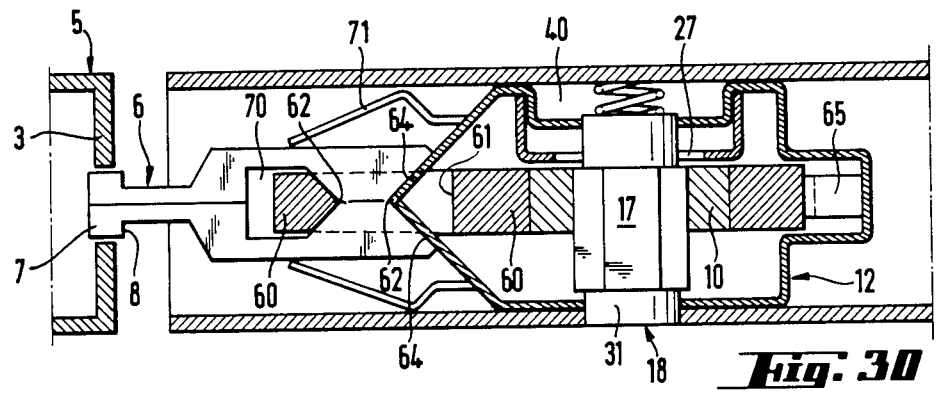
FIG. 30 is a horizontal sectional view of the connector of FIGS. 28-29, the jaws of the retaining members being located in the aperture between the flanges of the profiled member.
Figure 31:
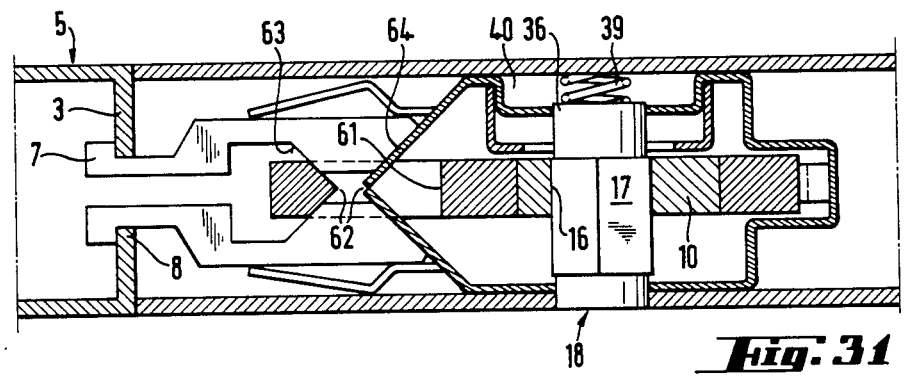
FIG. 31 is a horizontal sectional view similar to that of FIG. 30 but showing the retaining members in retracted positions.

A somewhat different mounting of the shaft 18 in the housing of the connector 1 is shown in FIGS. 24, 31 and 35. The housing of such connector simultaneously constitutes the biasing means 12 and the cylindrical portions 31 of the shaft 18 are mounted in two spaced-apart sidewalls of such combined housing and biasing means. The spring 39 is a coil spring which reacts against the inner side of the casing 23 of the hollow second member 2 and extends into the recess 37 of the shaft 18 to bias the shaft to the axial position which is shown in FIGS. 24, 31 or 35. In such position, the lower cylindrical portion 31 of the shaft 18 extends into the hole 20 of the casing 23. In this manner, the shaft 18 is properly journalled in the combined housing and biasing means 12 of the connector 1 as well as in the casing 23 of the hollow second member 2. The distance 40 between the end face of the upper cylindrical portion 31 (as seen in FIGS. 26 or 30 or 35) and the inner side of the adjacent sidewall of the casing 23 exceeds the thickness of the lower sidewall of the casing 23. In other words, there is ample room for expulsion of the shaft 18 from the hole 20 of the casing 23 so that the shaft remains properly journalled in the housing but is detached from the casing 23 preparatory to expulsion or extraction of the connector 1 from the hollow second member 2. The distance 40 need not appreciably exceed the thickness of that sidewall of the casing 23 which is formed with the hole 20.

In the embodiment which is shown in FIGS. 30 and 31, a portion of the upper sidewall of the combined housing and biasing means 12 is spaced apart from the inner side of the respective sidewall of the casing 23 so as to allow for axial movability of the shaft 18 to and from engagement with the lower sidewall of the casing 23.

The actuator 10 need not and normally does not share the axial movements of the shaft 18 to and from positions of engagement with the casing 23. This is desirable and advantageous because the mutual positions of the actuator 10 on the one hand and the displacing means 9 and motion transmitting means 14 on the other hand need not be altered preparatory to introduction of the connector 1 into or its expulsion or extraction from the member 2.

Referring again to the embodiment of FIGS. 1, 3 to 6 and 9 to 10, the displacing means 9 has a lateral projection 41 which serves as a means for limiting the extent of rotation of the actuator 10 relative to the housing 21. At least one half of the motion transmitting means 14 has a front end 43 which can engage the lateral projection 41 of the displacing means 9 when an operator wishes to rotate the actuator 10 and shaft 8 in a wrong direction, namely in a direction to move the retaining members 6 and their jaws 7 beyond the extended positions of FIGS. 3 and 5. As shown in FIGS. 3 and 5, the front end 43 of one member of the motion transmitting means 14 then abuts the lateral projection 41. If the two members of the motion transmitting means 14 are mirror symmetrical to each other, the displacing means 9 can be provided with to lateral projections 41, one for each member of the motion transmitting means 14. If the two members of the motion transmitting means 14 are not exactly mirror symmetrical to each other, for example, if one member is longer than the other, the displacing means 9 can have two offset abutments or lateral projections 41, one for each member of the motion transmitting means.

FIGS. 1, 3 and 4 show that each of the two jaws 7 extends all the way between the upper and lower edges of the displacing means 9, biasing means 12 and retaining members 6. However, it is also possible to provide differently configured jaws 7, for example, in a manner as shown in FIGS. 2 and 7. Thus, one of the jaws 7 is disposed at a level above the other jaw. The displacing means 9 then comprises two superimposed members one of which serves to shift the upper jaw 7 of FIG. 2 to the left while the other member of the displacing means 9 simultaneously shifts the lower jaw 7 to the right, namely from the second to the first position of the respective jaw. FIG. 2 shows the two jaws 7 in their first positions in which their inner sides 74 are engaged by the respective members of the displacing means 9. The two members of the displacing means 9 can be separated from each other by a narrow horizontal slot 44 which is shown in FIG. 2. Such members of the displacing means 9 move as a unit in response to rotation of the actuator 10 (not shown in FIGS. 2 and 7) from a predetermined starting angular position and in proper direction, namely in a direction which is permitted by the respective lateral projection or projections 41 (not shown in FIGS. 2 and 7) of the displacing means 9. The utilization of jaws 7 which are disposed at several levels is not limited to the embodiment of FIGS. 2 and 7, i.e., such jaws can be used with equal or similar advantage in at least some other embodiments of the improved connector 1.

Figure 8:
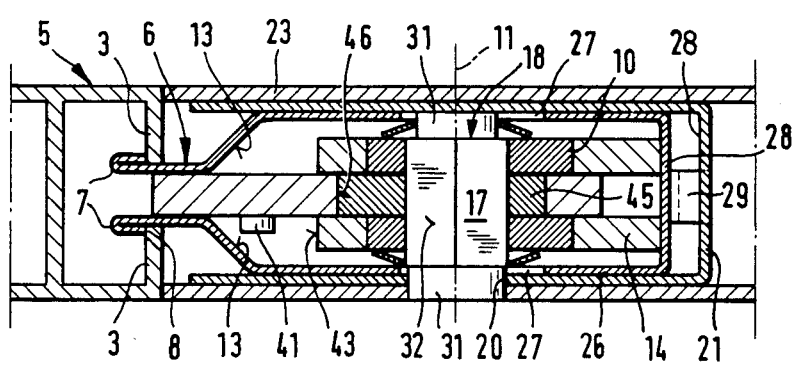
FIG. 8 is a horizontal sectional view of a third connector wherein the actuator has an additional eccentric for the displacing means, the jaws of the retaining members being shown in their first and retracted positions, i.e., full engagement with the inner sides of the respective flanges.

In the connector 1 of FIGS. 1, 3 to 6, 9 and 10, the position of the displacing means 9 relative to the shaft 18 remains unchanged because the displacing means spreads the jaws 7 of the retaining members 6 apart as a result of retraction of the biasing means 12, retaining members 6 and jaws 7 from the extended positions shown in FIG. 5 to those shown in FIG. 6. However, and as shown in FIG. 8, it is possible to provide a displacing means 9 which is caused to move toward or away from the profiled member 5 in response to joint rotation of the shaft 18 and actuator 10 for the purpose of moving the retaining members 6 from the extended to retracted positions. To this end, the connector 1 of FIG. 8 comprises an additional eccentric 45 which is mounted on the coupling portion 17 on the shaft 18 and is angularly offset relative to the eccentrics of the actuator 10 so that the movement of the jaws 7 from their second to their first positions is effected by the displacing means 9 which moves to the left, as seen in FIG. 8, under the action of the rotating additional eccentric 45 while the shifting of the retaining members 6 from the extended to the retracted positions is effected by the two eccentrics of the actuator 10. The embodiment of FIG. 8 will be utilized when it is desired to maintain the jaws 7 in engagement with the inner sides of the respective flanges 3 with a substantial force. Applicant believes that the provision of discrete eccentric means for the displacing means 9 on the one hand and motion transmitting means 14 on the other hand constitutes an independently patentable feature of the improved connector. The additional eccentric 45 is or can constitute a disc which is disposed between the eccentrics of the actuator 10 and receives torque directly from the coupling portion 17. The arrangement is preferably such that the surface surrounding the coupling hole of the additional eccentric 45 is complementary to the peripheral surface of the coupling portion 17 so as to ensure that the eccentric 45 is compelled to share all angular movements of the shaft 18 but that the shaft is free to move axially relative to all three eccentrics of FIG. 8. The additional eccentric 45 is received in an opening 46 of the displacing means 9 in such a way that the displacing means is compelled to spread the jaws 7 of the retaining members 6 apart (in order to move the jaws 7 to their first positions) in automatic response to joint rotation of the actuator 10 and shaft 18 from a predetermined starting position. As mentioned above, the movements of the displacing means 9 and motion transmitting means 14 can be synchronized in such a way that these movements take place simultaneously or at intervals during rotation of the shaft 18 from its starting position. All that is necessary is to ensure that the jaws 7 assume their first positions not later than when the biasing means 12 is fully retracted by the motion transmitting means 14, i.e., that the open ends 8 of the jaws 7 bear against the inner sides of the respective flanges 3 or 4 and hold the members 2 and 5 against any undesirable movements relative to each other.

In the embodiment of FIGS. 32 to 36, the connector 1 comprises an actuator 10 with a single eccentric which is disposed between two additional eccentrics 45 for the respective members of the displacing means 9. As mentioned above, two members of a single displacing means or two discrete displacing means 9 are necessary in the embodiment of FIGS. 32–36 because such displacing members must engage the cam faces 13 at the outer sides of the respective retaining members 6 in order to move the jaws 7 toward each other and into positions of overlap with the inner or rear sides of the respective flanges 4 of the profiled member 5. The windows for the additional disc-shaped eccentric or eccentrics 45 can be dimensioned in the same way as described for the eccentrics of the actuator 10 and for the windows 30 of the motion transmitting means 14 shown in FIGS. 1, 3–6 and 9–10. FIG. 34 shows that the eccentric of the actuator 10 and the additional eccentrics 45 can be angularly offset by 180°. If desired, the eccentric or eccentrics of the actuator 10 and the additional eccentric or eccentrics 45 can be rigidly connected to each other or they can be integral with one another. For example, one or more axially parallel pins or studs can be provided for insertion into complementary holes or bores in the eccentric or eccentrics of the actuator 10 and the additional eccentric or eccentrics 45.

The eccentricity of the additional eccentric or eccentrics 45 is preferably such that the displacing means 9 of FIG. 8 is movable close to or actually into the aperture 47 between the confronting flanges 3 of the profiled member 5 when the jaws 7 overlie the inner sides of the flanges 3. In this manner, the displacing means 9 even more reliably ensures that the jaws 7 cannot move toward each other when the connector 1 of FIG. 8 is operative to couple the members 2 and 5 to each other. In other words, the displacing means 9 can even more reliably hold the retaining members 6 against movement from their respective first positions because the displacing means fills that part of the aperture 47 which is not occupied by the adjacent portions of the retaining members 6 and/or their respective jaws 7. The advantages of such shifting of the displacing means 9 toward or actually into the aperture 47 will be readily appreciated by comparing FIGS. 6 and 8. As shown in FIG. 6, it is still possible to deflect the jaws 7 into register with the aperture 47, even in the retracted positions of the retaining members 6. This is not possible or is much less likely in the embodiment of FIG. 8 because the displacing means 9 actually extends into the aperture 47 when the biasing means 12 maintains the retaining members 6 and the jaws 7 in their retracted positions. The embodiment which is shown in FIG. 8 is particularly suitable when the connector must stand very pronounced stresses including dynamic stresses. This is due to the fact that the combined thickness of the retaining members 6 and the displacing means 9 matches or closely approximates the width of the aperture 47 between the confronting flanges 3 of the profiled member 5.

Two embodiments which are somewhat similar to the embodiment of FIG. 8 are respectively shown in FIGS. 17 and 18–19. The displacing means of FIG. 17 comprises a composite structure including three resilient sections 48 disposed one above the other and partially or fully separated from each other by horizontal slits or gaps 44. The front end portions 51 of the resilient sections 48 are bent in opposite directions when the displacing means is not in the process of maintaining the jaws 7 in their first positions. However, when the actuator 10 (not shown in FIG. 17) is caused to move the displacing means forwardly or to move the motion transmitting means 14 rearwardly with simultaneous spreading of the retaining members 6 by the displacing means including the resilient sections 48, the front end portions 51 of the resilient sections 48 are deformed as a result of their entry into the aperture 47 (not shown in FIG. 17) between the confronting flanges 3 of the profiled member 5 so that the deformed front end portions 51 of the sections 48 bias the retaining members 6 to their first positions with a force which surfaces to greatly reduce the likelihood of accidental separation of the profiled member 5 from the second member 2. The bias of the deformed front end portions 51 of the resilient sections 48 of the displacing means exceeds the bias of the biasing means 12, which urges the retaining members 6 to their second positions, to thus ensure that the jaws 7 are reliably held in engagement with the inner sides of the respective flanges 3 as soon as the actuator 10 assumes an angular position corresponding to that in which the retaining members 6 are retracted. The structure which is shown in FIG. 17 can compensate for manufacturing tolerances as well as for wear upon certain parts of the connector and imparts a certain versatility to the connector beyond that of the other connectors which do not employ elastically deformable displacing means. The elastically deformable front end portions 51 of the sections 48 of the displacing means shown in FIG. 17 ensure a highly desirable automatic centering of the two retaining members 6 in their first positions and a clearance-free retention of such retaining members in the first positions when the connector embodying the structure of FIG. 17 is in actual use.

FIGS. 18 and 19 show a modification of the connector of FIG. 7 wherein the displacing means comprises three resilient sections 49 in the form of plates including two outer plates having convex outer sides and a median plate. The median plate 49 defines a gap 50 of varying width with each of the outer plates 49. The width of the gaps 50 varies in a direction from the upper toward the lower edges of the plates 49. The convex outer sides of the outer plates 49 define longitudinally extending ridges (substantially midway between their upper and lower edges) which are parallel with the direction of movement of the retaining members 6 and their jaws 7 between the extended and the retracted positions. The median plate 49 can be omitted without departing from the spirit of the invention. When the displacing means including the plates or sections 49 is caused to move the jaws 7 apart, the outer plates 49 can undergo at least some deformation (for example, as a result of penetration into the aperture 47 between the flanges 3 of the profiled member 5) whereby they center the jaws 7 and ensure that such jaws cannot leave their first positions except in response to renewed intentional rotation of the actuator 10 and shaft 18. The maximum thickness of the composite displacing means including the sections or plates 49 is in the region substantially midway between the upper and lower edge faces of the displacing means. The convexity of the outer plates or sections 49 compensates for eventual differences between the widths of apertures 47 which are defined by the flanges 3 of discrete profiled members 5.

Referring again to FIG. 17, the resilient sections 48 can constitute parts of a one-piece displacing means wherein the front end portions 51 constitute discrete resilient lugs which are separated from each other by horizontal slits 44 so as to allow for some flexing of neighboring lugs relative to each other, for example, in response to penetration of the tips of such lugs into the aperture 47 between the flanges 3 of a profiled member 5. The number of lugs 51 can be reduced to two or increased to four or more without departing from the spirit of the invention. All that counts is to ensure that the lugs 51 are not exactly coplanar when the displacing means is not stressed so that they can move toward or into a common plane in response to penetration of their tips into the aperture 47. The extent of lateral shifting of neighboring lugs 51 relative to each other will depend upon the width of the aperture 47 and upon the thickness of the adjacent retaining members 6.

The sections or plates 48 or 49 of displacing means of the type shown in FIGS. 17–19 can be moved relative to the actuator 10 and shaft 18 by one or more additional disc-shaped eccentrics 45 (see FIG. 19). This does not entail more work or a greater effort on the part of the operator because all the operator has to do is to rotate the shaft 18 in order to turn the actuator 10 whereby the additional eccentric or eccentrics 45 automatically shift the displacing means including the sections 48 or 49 in synchronism with movements of the retaining members 6 to their retracted positions in which the spring 29 of the housing 21 is stressed and biases the displacing means 14 and the retaining members 6 toward their extended positions.

The connector 1 which is shown in FIGS. 11 to 14 comprises an actuator 10 with two eccentrics in the form of disc cams. Each disc cam of the actuator 10 has a lobe 52 which can engage the adjacent portion of the corresponding member of the motion transmitting means 14 in order to move the motion transmitting means against the opposition of the leaf spring 29 from the extended position of FIG. 12, through the intermediate position of FIG. 13, and to the retracted position of FIG. 14. The cam face of each member of the motion transmitting means 14 has a plurality of specially designed portions or sections which are shown in FIGS. 12, 13 and 14. The motion transmitting means 14 operates between the two cams of the actuator 10 and the biasing means 12 for the retaining members 6 and their jaws 7. The lobe 52 of each cam is flanked by two intermediate portions and the height of each cam in the extended positions of the retaining members 6 (see FIG. 12) equals the distance between the top and bottom walls of the housing 12. The height of each cam thus equals or approximates the height of each member of the motion transmitting means 14. In other words, the motion transmitting means 14 is compelled to perform reciprocatory movements toward and away from the profiled member 5. The two members of the motion transmitting means 14 need not be provided with windows for the cams of the actuator 10 but merely with suitably configured concave surfaces. In other words, the entire motion transmitting means 14 can be located to the right of the actuator 10 as seen in FIGS. 11-14. The spring 29 ensures that the two members of the motion transmitting means 14 invariably abuts the respective cams of the actuator 10. Such design of the actuating means 14 contributes to its compactness, lower weight and lower cost.

As shown in FIGS. 12-14, each cam of the actuator 10 has a convex portion 53 which is adjacent the lobe 52 and can engage a concave portion 54 of the cam face of the respective member of the motion transmitting means 14. The convex portion 53 of each cam of the actuator 10 is adjacent the respective concave portion 54 during an initial stage of rotation of the actuator 10 from its starting angular position. At such time, each lobe 52 travels along a suitably configured follower portion 55 of the respective member of the motion transmitting means 14 so as to ensure that the motion transmitting means does not move against the opposition of the spring 29. The movement of the motion transmitting means 14 and of the biasing means 12 against the opposition of the spring 29 begins when the lobes 52 reach the follower portions 56 of the respective cam faces, and such follower portions have straight surfaces which ensure that the motion transmitting means 14 is shifted to the right at a predetermined rate in order to shift the retaining members 6 to their retracted positions. In other words, no shifting of the biasing means 12 against the opposition of the leaf spring 29 takes place while the lobes 52 travel along the portions 55 of the respective cam faces. Such shifting begins to take place only when the lobes 52 engage the respective follower portions 56. The inclination of straight parts of the follower portions 56 is such that they cross the arcuate path of movement of the respective lobes 52 about the axis of the actuator 10. The just described configuration of cam faces on the two members of the motion transmitting means 14 ensures that the movement of retaining members 6 from their extended to their retracted positions takes place with a certain delay following the movement of their jaws 7 from the second to first positions, i.e., from positions of register with the aperture 47 of the profiled member 5 to positions of overlap with the respective confronting flanges 3 of the member 5.

The two cams of the actuator 10 have lateral projections 57 which extend toward each other in the space between the two cams (see particularly FIG. 11) and each of which can constitute a short stud in a suitably configured opening of the displacing means 9. The lateral projections 57 can be said to constitute wipers which shift the displacing means 9 to the left in response to the initial stage of angular movement of the actuator 10 from its starting angular position of FIG. 12. This causes the displacing means to shift the jaws 7 to the (first) positions of FIG. 11 in which the jaws overlie the inner sides of the respective flanges 3 before the lobes 52 of the cams of the actuator 10 reach the follower portions 56 of the respective members of the motion transmitting means 14 for the purpose of shifting the retaining members 6 to their retracted positions. The surfaces 58 surrounding the openings in the displacing means 9 can be said to constitute followers which track the lateral projections 57 and ensure that the displacing means is compelled to move to the position of FIG. 11 in response to rotation of the actuator 10 from its starting position not later than when the retaining members 6 reach their retracted positions but preferably somewhat earlier so as to guarantee that the jaws 7 overlie the inner sides of the respective flanges 3 and can engage such inner sides at the time when the spring 29 stores energy as a result of movement of the retaining members 6 from the extended positions to the retracted positions (the retracted positions of the retaining members 6 are shown in FIG. 11). The inclination of those portions of internal surfaces 58 bounding the openings in the displacing means 9 is such that the portions which are engaged by the lateral projections 57 slope toward the axis of the actuator 10, i.e., the straight portions of the surfaces 58 bounding the openings in the displacing means 9 intersect the paths of movement of the lateral projections 57 about the axis of the actuator 10 and its shaft 18.

It is clear that the lateral projections 57 can be replaced with an additional cam (45) in order to shift the displacing means 9 relative to the actuator 10 in synchronism with shifting of the motion transmitting means 14, preferably in such a way that the retaining members 6 are moved apart at least slightly prior to completion of movement of the retaining members to their retracted positions. Delayed shifting of retaining members 6 to their retracted positions is desirable because the retaining members invariably assume their first positions in good time prior to movement of their jaws 7 into actual contact with the inner sides of the respective flanges 3. In other words, a spreading of the retaining members 6 takes place ahead of actual final clamping of the members 2 and 5 against each other by the jaws 7 and flanges 3. This simplifies the assembly of a skeleton structure or the like because the operators can effect a preliminary coupling of the members 2 and 5 to each other prior to final clamping by simply turning the actuator 10 of FIGS. 11-14 through a certain angle which suffices to spread the jaws 7 apart to the positions which are shown in FIG. 11 prior to movement of the motion transmitting means 14 to the fully retracted position of FIG. 14. Still further, such two-stage operation of the actuator 10 of FIGS. 11 to 14 is desirable on the ground that the operator need not apply a very substantial force for effecting a movement of the jaws 7 away from each other and for simultaneously shifting the retaining members 6 from their extended to their retracted positions. In other words, the operator can exert a relatively small first force to first spread the jaws 7 apart by way of the displacing means 9 and thereupon a relatively small second force in order to shift the retaining members 6 to the retracted positions which are shown in FIG. 11.

The housing 21 of the connector 1 which is shown in FIG. 15 deviates from the housings which are shown in FIGS. 1, 3-6 and 9-10 in that it resembles a tube having a closed rear end, an open front end, two parallel sidewalls and two additional walls or panels 59 each of which is integral with and constitutes a bent-over portion of the respective sidewall. In this manner, the parts which are confined in the housing 21 are shielded from five sides, i.e., the housing 21 is open only at that (front) side which faces the profiled member 5 when the latter is coupled with a hollow second member 2. It is often sufficient to provide only one of the sidewalls of the housing 21 with an additional wall or panel 59, i.e., one can omit the upper or the lower panel or wall 59 of FIG. 15. An advantage of the structure which is shown in FIG. 15 is that all sensitive parts of the connector 1 are properly confined so that only the jaws 7 of the retaining members 6 must project beyond the front end of such housing. This is desirable not only to adequately protect the confined parts but also for manipulation of the connector. A single type of connector can be used for coupling different types of profiled members as long as the housing 21 can be properly installed and anchored in the selected member 2.

FIG. 16 shows a slight modification of the embodiment of FIG. 15 in that each of the sidewalls of the housing 21 has two bent-over portions which together constitute a composite panel 59. In other words, the one-piece top panel 59 of FIG. 15 is replaced by a two-piece composite panel 59 having portions which are integral with the respective sidewalls of the housing 21. In all other respects, the connector of FIG. 16 is or can be identical with the connector of FIG. 15 as well as, for example, with the connector of FIGS. 1, 3–6 and 9–10.

The embodiments which are shown in FIGS. 1–31 are used to engage the outwardly extending jaws 7 of two retaining members 6 with substantially C-shaped portions of profiled members 5, namely with profiled members wherein the flanges 3 extend toward each other and define an elongated aperture 47. The embodiment which is shown in FIGS. 32–36 employs a pincer-like retaining means with two jaws 7 which must move toward each other in order to properly engage the respective external flanges 4 of the profiled member 5. The latter can constitute an I-beam or an H-beam. The biasing means 12 for the retaining members 6 of FIGS. 32–36 must be designed with a view to bias the jaws 7 away from each other, and the displacing means 9 of FIGS. 32–36 is designed to move the jaws 7 toward each other in response to rotation of the actuator 10 in a predetermined direction starting from a predetermined angular position. The connector 1 of FIGS. 32–36 can employ a simple one-piece motion transmitting means 14 which is confined in the biasing means 12 and is disposed midway between the additional cams 45 for the corresponding members of the displacing means 9. All parts of the connector are installed in the substantially U-shaped housing 21 the front side of which is open so as to enable the retaining members 6 and their jaws 7 to project forwardly toward positions of engagement with the rear or inner sides of the respective flanges 4. The biasing means 12 can comprise or constitute a single one piece yoke which is made of suitable resilient material (such as spring steel) and the legs of which are preferably integral with the respective retaining members 6. The motion transmitting means 14 is shiftable by a single eccentric of the actuator 10, and such single eccentric is flanked by the additional eccentrics 45 for the respective members of the displacing means 9. The shaft 18 is shiftable axially relative to the eccentric of the actuator 10 as well as relative to the additional eccentrics 45 against the opposition of the aforediscussed coil spring 39 which enables the shaft to become disengaged from the casing 23 preparatory to expulsion or extraction of the housing 21 of the connector 1 from the hollow member 2.

The eccentric of the actuator 10 is angularly offset relative to the additional eccentrics 45 in a manner and for the purposes as described discussed in connection with the embodiment of FIG. 8 so as to ensure that one can achieve a staggered shifting of the displacing means 9 and motion transmitting means 14 relative to the shaft 18 in directions toward or away from the flanges 4 of the profiled member 5. The additional cams 45 can move the respective members of the displacing means 9 very close to the flanges 4 when the connector 1 of FIGS. 32–36 is operative (see particularly FIG. 36) in order to reduce the likelihood of accidental separation of the jaws 7 from the respective flanges 4.

Figure 22:
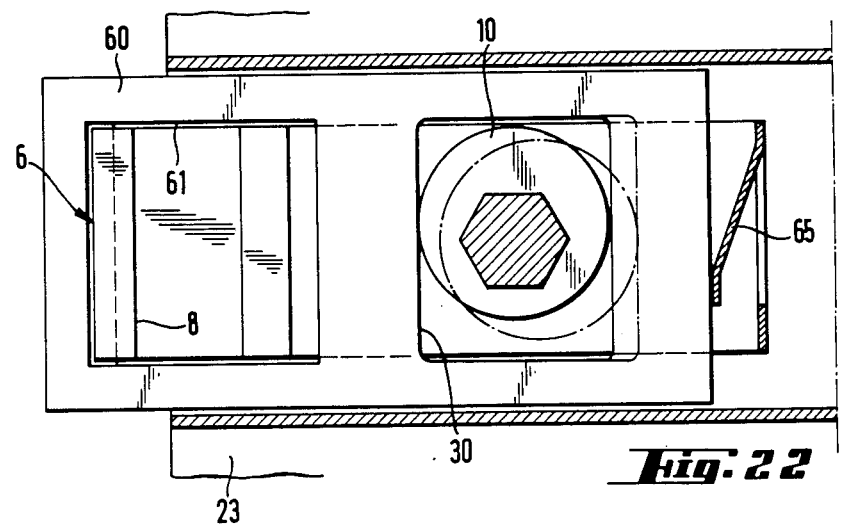
FIG. 22 is a longitudinal vertical sectional view of the connector of FIG. 20 with the retaining members in extended positions corresponding to those shown in FIG. 20.
Figure 23:
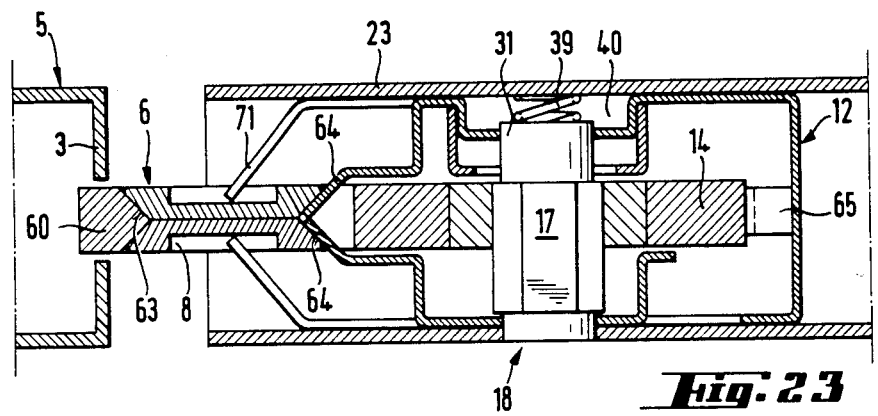
FIG. 23 is a horizontal sectional view of the connector of FIGS. 20 and 22 with the retaining members and their jaws in extended positions during introduction into the aperture between the confronting flanges of the profiled member.

FIGS. 20–31 show three additional embodiments of the improved connector 1. The main difference between these embodiments and the previously discussed embodiments is that the configuration of the retaining members 6 deviates from that of other retaining members and in that the displacing means 9 comprises a frame which surrounds the retaining members 6 as well as the motion transmitting means 14. In the embodiment of FIGS. 20, 22, 23 and 24, the displacing means 9 comprises a rectangular frame-like locking bolt 60 defining an opening or window 61 for the retaining members 6. The left-hand part of the locking bolt 60 constitutes a wedge-like portion 62 which can be moved relative to the suitably inclined complementary flanks 63 of the retaining members 6 in order to move the retaining members and their jaws 7 apart in response to rightward movement of the bolt 60 as seen in FIGS. 22–24. As shown in FIG. 23, the wedge-like portion 62 of the bolt 60 can enter the aperture 47 between the flanges 3 of the profiled member 5 ahead of the jaws of the retaining members 6. This allows for a more accurate guidance of the connector 1 during introduction of the jaws of the retaining members 6 into the interior of the profiled member 5, i.e., preparatory to spreading apart of the jaws 7 to positions of overlap with the inner sides of the respective flanges 3.

The opening 61 of the frame-like locking bolt 60 of the displacing means in the connector 1 which is shown in FIGS. 20 and 22–24 further receives a second wedge-like portion 62 which is defined by suitably inclined extensions 64 of the biasing means 12 for the retaining members 6. In this connector, the biasing means 12 is not and need not be an integral part of the retaining means including the members 6 and their jaws. The corresponding portions of the retaining members 6 have suitably inclined complementary flanks 63 so that the retaining members 6 are compelled to move apart from the positions of FIG. 23 to the positions of FIG. 24 in response to each movement of the wedge-like portion 62 of the bolt 60 toward the wedge-like portion 62 of the biasing means 12 and/or vice versa. In other words, the retaining members 6 move apart when the wedge-like portions 62 of the bolt 60 and biasing means 12 are caused to move nearer to each other. At such time, the jaws of the retaining members 6 move to positions of overlap with the inner sides of the respective flanges 3 so as to ensure that the jaws will engage such inner sides in response to retraction of the retaining members 6 by the motion transmitting means 14.

When the retaining members 6 are free to assume their extended positions, they are or they can be completely confined in the opening 61 of the bolt 60. This can be seen in FIG. 23. The biasing means 12 has extensions in the form of prongs or tines 64 which define the respective wedge-like portion 62, and the biasing means 12 further comprises additional prongs 71 which engage the outer sides of and bias the retaining members 6 to the second positions shown in FIG. 23. In other words, the wedge-like portions 62 of the bolt 60 and of the biasing means 12 must overcome the resistance of the prongs 71 in order to move the retaining members 6 from the second positions of FIG. 23 to the first positions of FIG. 24.

The eccentric of the actuator 10 can move the displacing means 9 (i.e., the frame-like locking bolt 60) through the medium of the motion transmitting means 14. The majority of parts which constitute the connector 1 of FIGS. 20 and 22-24 are installed in the biasing means 12 which simultaneously constitutes a housing of the connector. The biasing means 12 comprises a leaf spring 65 which bears against the adjacent portion of the locking bolt 60 in order to urge such locking bolt to the position of FIG. 23 in which the prongs 71 of the biasing means 12 are free to maintain the retaining members 6 in abutment with each other within the confines of the window or opening 61. The leaf spring 65 is integral with the biasing means 12; however, it is equally possible to provide a separate leaf spring, one or more coil springs or any other suitable resilient means which can urge the locking bolt 60 to the position of FIG. 23.

It goes without saying that the one-piece jaws of the retaining members 6 shown in FIGS. 20 and 22-24 can be replaced with staggered jaws of the type shown in FIGS. 2 and 7 without departing from the spirit of the invention. In fact, the retaining members 6 of FIGS. 20 and 22-24 can be disposed at different levels in their entirety by properly selecting the configuration of the wedge-like portions 62 of the locking bolts 60 and biasing means 12 so as to ensure that the superimposed retaining members 6 will move apart and will cause their jaws to properly engage the inner sides of the respective flanges 3 as soon as the two wedge-like portions 62 are moved nearer to each other.

The thickness of the front portion of the locking bolt 60 preferably equals or closely approximates the width of the aperture 47 between the flanges 3 of the profiled member 5 for the aforediscussed reasons, namely to avoid wobbling of the members 2 and 5 relative to each other during assembly and to ensure a more reliable introduction of the jaws of retaining members 6 into the interior of the profiled member 5.

The embodiment of FIGS. 21 and 25-27 differs from the embodiment of FIGS. 20 and 22-24 in that the one-piece rigid locking bolt 60 is replaced with a locking bolt having an elongated tensioning band 66 which surrounds a wedge-like portion 68, corresponding to the left-hand wedge-like portion 62 of FIG. 24, and the end portions 72 of which are anchored in the motion transmitting means 14. The motion transmitting means 14 has a slot 73 in which the end portions 72 of the band 66 are received. Such band can be made of spring steel or of any other suitable wear-resistant resilient material. The leftmost portion of the band 66 can extend into a suitably configured groove 67 of the wedge-like portion 68 of the composite locking bolt of the connector which is shown in FIGS. 21 and 25-27. The motion transmitting means 14 is remote from the wedge-like portion 68 and is disposed within the confines of the combined biasing means and housing 12. The band 66 is kept under constant tension by the wedge-like portion 68 which engages the jaws of the retaining members 6 and by the motion transmitting means 14 which is in engagement with the eccentric of the actuator 10. When the eccentric of the actuator 10 is rotated, the tensioning of the band 66 is even more pronounced.

An advantage of the embodiment which is shown in FIGS. 21 and 25-27 is that the weight of the composite locking bolt 66, 68 can be a small fraction of the weight of the sturdier locking bolt 60 which is shown in FIGS. 20 and 22-24.

The connector 1 of FIGS. 28-31 is analogous to the connectors of FIGS. 20-27 except that it comprises differently configured retaining means having two mirror symmetrical retaining members 6 with jaws 7 and a wedge-like chamber 70 for the wedge-like portion 62 of the locking bolt 60. The opening or window 61 of the locking bolt 60 receives only portions of the retaining members 6 because a substantial part of each retaining member extends forwardly beyond the wedge-like portion 62 of the bolt 60 so that the jaws 7 can enter the interior of the profiled member 3 preparatory to movement into positions of overlap with the inner sides of the respective flanges 3. When the actuator 10 is rotated in a proper direction, the distance between the wedge-like portions 62 of the locking bolt 60 and biasing means 12 decreases so that the retaining members 6 are moved apart and the jaws 7 engage the inner sides of the respective flanges 3 in a manner as shown in FIG. 31 as soon as the retaining members are retracted by the motion transmitting means 14 and biasing means 12.

In each of the three embodiments which are shown in FIGS. 20-31, the prongs 71 can be disposed midway between the respective prongs 64 or vice versa. It is also possible to provide a single prong 64 and a single prong 71 for each retaining member 6, i.e., to place two prongs 64 and 71 at different levels. The dimensions of each of these prongs will depend on the force with which the retaining members 6 are to be biased to their first and second positions.

Referring again to FIGS. 1 and 3 to 6, the two eccentrics of the actuator 10 can be integrally or rigidly connected to each other so as to ensure that they move as a unit when the shaft 18 is rotated. To this end, and if the actuator 10 comprises two separately produced eccentrics, the eccentrics can be properly coupled to each other by one or more axially parallel pins (not specifically shown) the end portions of which extend into complementary recesses or through holes of the eccentrics. The same applies for the two cams of the actuator 10 which is shown in FIGS. 11-14. In other words, the lateral projections 57 of the two cams can be replaced by a pin the end portions of which are anchored in the two cams and which can serve as a means for transmitting motion to the displacing means 9 in response to rotation of the actuator 10 about the axis 11. The replacement of lateral projections 57 by a single pin which establishes a direct connection between the two cams of FIGS. 11-14 is often desirable and advantageous, especially if the actuator 10 is to transmit to the displacing means 9 substantial forces to in order hold the displacing means in the position which is shown in FIG. 11. All in all, such construction of the connector contributes to longer useful life of its parts and to a higher reliability of the coupling between the members 2 and 5. If the provision of a direct connection between the eccentrics or between the cams of the actuator 10 does not suffice, the cams or eccentrics can be integral with each other as long as they provide sufficient room for installation of the displacing means 9, biasing means 12, motion transmitting means 14 and other component parts of the connector.

An important advantage of the improved connector is that it accomplishes several objects which, at a first glance, would appear to be contradictory and could not be achieved by resorting to a single connector. Thus, the connector renders it possible to establish a connection between the members 2 and 5 with a minimum of effort, the useful life of the connector and of its parts is surprisingly long, and the connector can be readily installed in or removed from the member 2 without the need for hammers or similar impacting tools. The provision of motion transmitting means 14 brings about the advantage that the eccentric or eccentrics or the cam or cams of the actuator 10 need not act directly upon the yoke-like biasing means 12 and/or retaining members 6. The result is a longer useful life of the retaining members 6 and biasing means 12 which constitutes an important advantage over previously known connectors, for example, those disclosed in German Pat. No. 22 39 370. The reason is that the retaining members are not subjected to pronounced specific stresses which could entail pronounced localized wear and inaccuracies in the retaining or coupling action of the connector.

Another important advantage of the improved connector is that the shaft 18 can be shifted relative to the actuator 10 so that the latter can remain in the housing 21 or in the combined housing and biasing means 12 so that its position relative to the displacing means and/or motion transmitting means need not be changed at all when an operator wishes to install the connector in or to expel or withdraw the connector from the member 2. Reference may be had to the aforementioned published German Patent Application No. 31 28 595 wherein the actuator and the shaft cannot move relative to each other. The features that the eccentric or eccentrics or the cam or cams of the actuator 10 and the shaft 8 are movable axially relative to each other contributes significantly to versatility of the improved connector and to a reduction of pronounced specific stresses, pronounced friction, deformation and other undesirable phenomena which could adversely influence the useful life and/or the accuracy of coupling action of the connector. Many heretofore known connectors employ actuators and shafts which are rigidly or integrally connected with each other so that each axial shifting of the shaft entails a corresponding axial displacement of the actuator with resulting sliding of the actuator relative to other parts of the connector. Such conventional mode of mounting the actuator and the shaft for joint axial movement reduces the useful life of conventional connectors. In spite of axial movability of the shaft and actuator relative to each other, the improved connector can transmit and stand forces which are at least as large as those which can be taken up by conventional connectors.

The shaft 18 can be shifted relative to the housing of the connector 1 and relative to the actuator 10 without resorting to hammers and similar tools which would be likely to damage or destroy the connector. The provision of the spring 39 is desirable and advantageous because such spring ensures that the shaft 18 automatically snaps into proper engagement with the casing 23 of the hollow member 2 as soon as the housing 21 of the combined housing and biasing means 12 of the improved connector is properly introduced into the casing 23.

The improved connector can employ one or more simple disc-shaped eccentrics or cams as a means for moving the motion transmitting means 14. This is desirable and advantageous because it contributes to a reduction of the weight and cost of the connector. The distribution of forces in a relatively thin disc-shaped eccentric or cam is highly satisfactory so that the thickness of the eccentric or cam can be kept to a minimum, especially if the eccentric or cam is properly confined against lateral deflection when it is called upon to shift the motion transmitting means 14.

It is also within the purview of the invention to omit the housing 21 and to permanently or more or less permanently install the connector in a hollow member such as the member 2. The provision of a housing 21 or a combined housing and biasing means 12 is preferred at this time because this allows for the assembly of the entire connector outside of the member 2 and for convenient installation of the assembled connector in, or its extraction or expulsion from, the member 2 in a time-saving operation. The same applies for the establishment of integral connections between the retaining members 6 and the biasing means 12. The utilization of a one-piece body which constitutes the biasing means 12 and retaining members 6 is preferred at this time because this contributes to simplicity of installation or assembly of the connector.

The utilization of an actuator 10 with a single eccentric or cam for the motion transmitting means 14 contributes to simplicity and compactness of the connector 1. On the other hand, an actuator 10 with a plurality of eccentrics or cams exhibits the advantage that the forces which develop in response to rotation of the actuator are or can be uniformly distributed to several portions of the motion transmitting means 14 and to the biasing means 12 for the retaining members 6. The placing of displacing means 9 between two eccentrics or cams of the actuator 10 ensures a more reliable guidance of the displacing means and a retention of displacing means in an optimum position to guarantee that the retaining members 6 are compelled to move from their second to their first positions in response to rotation of the actuator 10 from a predetermined starting angular position and in a proper direction.

Various features of the described embodiments can be combined with each other without departing from the spirit of the invention. By way of example, the connector 1 of FIG. 1 can be equipped with disc cams in lieu of eccentrics which form part of the actuator 10. Furthermore, the eccentrics of the actuator 10 and the additional eccentric 45 of FIG. 8 can be made of one piece so as to further reduce the cost of assembly or dismantling. Delayed movements of retaining members 6 to retracted positions (following the movements of such retaining members to their first positions) can be relied upon in each embodiment of the improved connector if it is desirable to reduce the magnitude of forces which must be applied to rotate the actuator 10. The dimensions of various parts of the connector can be altered practically at will so as to ensure that the connector will stand the stresses which develop in a particular construction utilizing the profiled members 2 and 5 or analogous members. If desired or necessary, the motion transmitting means 14 can be constructed in the form of a laminated (multi-layer) structure somewhat analogous to that shown for the displacing means 9 of FIGS. 18 and 19.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A connector for separably securing at least one flange of a profiled member to a second member having an open front side adjacent the flange of the profiled member and a sidewall provided with a hole, comprising a support including a housing insertable into and removable from said second member by way of said front side; retaining means including at lest one retaining member disposed in said housing and movable between a first position of at least partial overlap with the one flange and a second position out of register with the one flange as well as back and forth between an extended position out of contact with and a retracted position of engagement with the one flange; an actuator rotatably mounted in said housing; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator, said motion transmitting means and said displacing means being disposed in said housing; and means for rotating said actuator relative to said second member and said housing, comprising a shaft surrounded by said actuator and having an end portion in the hole of the sidewall of the second member, said shaft further having a coupling portion in torque transmitting engagement with said actuator.

2. The connector of claim 1, wherein said actuator comprises eccentric means and said motion transmitting means comprises follower means tracking said eccentric means.

3. The connector of claim 1, further comprising spring means for yieldably opposing expulsion of said end portion of said shaft from said hole.

4. The connector of claim 1, wherein said actuator comprises at least one substantially disc-shaped eccentric and said motion transmitting means includes a motion/receiving portion cooperating with said eccentric.

5. The connector of claim 1, wherein said support has a hole in register with the hole of said sidewall, said end portion of said shaft being rotatable in said holes.

6. The connector of claim 1, further comprising means for biasing said retaining member to said second position, said shaft having a portion extending into an elongated slot of said biasing means with freedom of movement of said biasing means and said retaining member between said extended and retracted positions.

7. The connector of claim 6, wherein said biasing means comprises a substantially U-shaped spring having a web and two legs one of which is provided with said slot, said motion transmitting means being disposed between said legs and being arranged to move the retaining member to said retracted position by way of said web.

8. The connector of claim 1, wherein said actuator comprises a substantially disc-shaped eccentric and said motion transmitting means has an internal cam receiving motion from said eccentric in response to rotation of said actuator.

9. The connector of claim 1, wherein said shaft further includes at least one cylindrical portion rotatably journalled in said support and said coupling portion is adjacent said cylindrical portion, said coupling portion extending radially beyond said cylindrical portion.

10. The connector of claim 1, wherein said shaft is splined including is rotatably journalled in said support, said actuator having a coupling hole non-rotatably receiving said splined shaft.

11. The connector of claim 1, wherein said shaft is rotatably journalled in said support and/or in said second member, said shaft and said actuator having complementary flats to ensure that said actuator shares rotary movements of said shaft.

12. The connector of claim 1, wherein said shaft is externally toothed and is rotatably journalled in said support and/or in said second member, said actuator having internal teeth mating with the teeth of said shaft and said shaft and said actuator being movable axially relative to each other.

13. The connector of claim 1, said shaft being rotatably journalled in said support and/or in said second member and having a polygonal coupling portion in torque transmitting engagement with a complementary portion of said actuator, said actuator and said shaft being movable axially with reference to one another.

14. The connector of claim 1, said shaft being rotatably journalled in said support and/or in said second member and being mounted in said actuator for axial movement, and further comprising means for holding said shaft against axial movement relative to said actuator.

15. The connector of claim 1, wherein said actuator comprises a plurality of eccentrics which are rigid with one another, at least one of said eccentrics being arranged to transmit motion to said motion transmitting means.

16. The connector of claim 1, further comprising means for biasing said retaining member to said second position, said displacing means comprising a plurality of resilient sections arranged to apply to said retaining member a force in a direction to move the retaining member to said first position, the magnitude of said force exceeding the bias of said biasing means.

17. The connector of claim 1, wherein said actuator comprises a disc cam having a lobe and said motion transmitting means comprises follower means tracking said lobe, and further comprising means for biasing said retaining member to said second position, said motion transmitting means being operative to move said retaining member to said retracted position exclusively by way of said biasing means.

18. The connector of claim 1 for separably securing two confronting flanges of a profiled member wherein the flanges define an aperture, said housing having an open front end facing the flanges and said retaining means comprising two retaining members, said retaining members and being mounted in said housing and said displacing means comprising a locking bolt which is reciprocable by said actuator and has a substantially wedge-like portion arranged to advance between and to thereby move said retaining members to said first positions upon insertion of said bolt and portions of said retaining members into the aperture of the profiled member and in response to rotation of said actuator.

19. The connector of claim 18 for separably securing two confronting flanges of a profiled member wherein the aperture between the flanges has a predetermined width, said bolt having a thickness which equals or approximates said predetermined width.

20. The connector of claim 18, wherein said retaining members together define a chamber for the wedge-like portion of said bolt.

21. The connector of claim 20, wherein said support comprises means for biasing said retaining members to said second positions.

22. The connector of claim 1, wherein said motion transmitting means comprises two rigidly interconnected motion transmitting members and said actuator comprises two substantially disc-shaped eccentrics and means for connecting said eccentrics to each other, said connecting means being arranged to move said displacing means relative to said retaining means in response to rotation of said actuator.

23. A connector for separably securing two flanges of a profiled member to a second member, comprising retaining means including two retaining members, one for each flange of the profiled member and each movable between a first position of at least partial overlap with the respective flange and a second position out of register with the respective flange as well as back and forth between an extended position out of contact with and a retracted position of engagement with the respective flange; a support; an actuator rotatably mounted in said support; displacing means for effecting a movement of said retaining members to said first positions in response to rotation of said actuator, said displacing means being disposed between said retaining members; motion transmitting means interposed between said actuator and said retaining members for effecting a movement of said retaining members, in the first positions of said retaining members, to said retracted positions in response to rotation of said actuator; and means for rotating said actuator including a shaft surrounded by said actuator and rotatably journalled in said support, said shaft having a coupling portion surrounded by said displacing means and said actuator comprising two disc-shaped eccentrics in torque receiving engagement with said coupling portion at opposite sides of said displacing means, said motion transmitting means including a discrete motion transmitting member for each of said retaining members and each of said motion transmitting members having means for receiving motion from a different one of said eccentrics.

24. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support, said actuator comprising a substantially disc-shaped eccentric; displacing means for effecting a movement of said retaining member to said first position in response to rotation of said actuator; and motion transmitting means interposed between said actuator and said retaining member for effecting a movement of said retaining member, in the first position of said retaining member, to said retracted position in response to rotation of said actuator, said motion transmitting means having an internal cam receiving motion from said eccentric in response to rotation of said actuator, said motion transmitting means further having a window which is surrounded by said internal cam and said window having a width which equals or approximates the diameter of said eccentric.

25. The connector of claim 24, wherein said eccentric has a predetermined eccentricity and said window has a length which at least equals the sum of the diameter and the eccentricity of said eccentric.

26. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; said actuator comprising a substantially disc-shaped eccentric; displacing means for effecting a movement of said retaining member to said first position in response to rotation of said actuator; and motion transmitting means interposed between said actuator and said retaining member for effecting a movement of said retaining member, in the first position of said retaining member, to said retracted position in response to rotation of said actuator, said motion transmitting means having an internal cam receiving motion from said eccentric in response to rotation of said actuator, said motion transmitting means further having a circular window which is surrounded by said internal cam and snugly but rotatably receives said eccentric.

27. The connector of claim 26, wherein said support includes a housing and said motion transmitting means is installed in said housing with freedom of movement the extent of which at least equals the eccentricity of said eccentric.

28. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; and motion transmitting means interposed between said actuator and said retaining member for effecting a movement of said retaining member, in the first position of said retaining member, to said retracted position in response to rotation of said actuator; and means for rotating said actuator, including a shaft having two coaxial cylindrical portions rotatably journalled in said support and a coupling portion adjacent and flanked by said cylindrical portions, said coupling portion being in torque transmitting engagement with said actuator and extending radially beyond said cylindrical portions.

29. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator; means for biasing said retaining member to said second position; and means for rotating said actuator, said rotating means including a shaft having a polygonal coupling portion in torque transmitting engagement with said actuator and a cylindrical portion adjacent said coupling portion, said coupling portion having facets disposed tangentially of said cylindrical portion having facets disposed tangentially of said slot for said cylindrical portion and at least one abutment closely adjacent said coupling portion and arranged to prevent axial movement of said shaft relative to said actuator in one direction in predetermined angular positions of said shaft.

30. The connector of claim 29, wherein said facets define edges and said abutment is in register with one of said edges in each of said predetermined angular positions of said shaft.

31. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator; resilient means for biasing said retaining member to said second position; means for rotating said actuator including a shaft having a first end portion rotatably journalled in said second member, a coupling portion in torque-transmitting engagement with said actuator, and a second end portion having an axially extending recess, said support having a sleeve in said recess so that said second end portion is rotatably mounted in said support; and a spring reacting against said second member and extending into said recess to oppose axial movements of said shaft in a direction to disengage said first end portion from said second member.

32. The connector of claim 31 wherein said support is removably installed in said second member and said shaft is movable axially against the opposition of said spring to an extent such that the first end portion is disengaged from said second member so that the support can be withdrawn from said second member.

33. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator, said displacing means comprising means for limiting the extent of rotation of said actuator with reference to said support; and motion transmitting means interposed between said actuator and said retaining member for effecting a movement of said retaining member, in the first position of said retaining member, to said retracted position in response to rotation of said actuator.

34. The connector of claim 33, wherein said limiting means comprises a lateral projection provided on said displacing means, said motion transmitting means having a front end movable into abutment with said projection in response to rotation of said actuator in a predetermined direction and a rear end arranged to move said retaining member to said retracted position in response to rotation of said actuator counter to said predetermined direction.

35. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; and motion transmitting means interposed between said actuator and said retaining member for effecting a movement of said retaining member, in the first position of said retaining member, to said retracted position in response to rotation of said actuator, said actuator comprising at least one first eccentric arranged to move said retaining member to said retracted position by way of said motion transmitting means in response to rotation of said actuator from a predetermined position in a predetermined direction, and an additional eccentric arranged to move said retaining member to said first position by way of said displacing means in response to rotation of said actuator from said predetermined position in said predetermined direction.

36. The connector of claim 35, wherein said eccentrics are angularly offset relative to each other so that said displacing means moves in a given direction and said motion transmitting means moves counter to said given direction in response to rotation of said actuator from said predetermined position and in said predetermined direction.

37. The connector of claim 36, wherein the throw of said additional eccentric is such that said displacing means is closely or immediately adjacent the flange of the profiled member in the retracted position of said retaining member.

38. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator; and means for biasing said retaining member to said second position, said displacing means comprising a plurality of resilient sections arranged to apply to said retaining member a force in a direction to move said retaining member to said first position, the magnitude of said force exceeding the bias of said biasing means and said sections including plates which define a gap, at least one of said plates having a convex side abutting said retaining member.

39. The connector of claim 38, wherein said convex side has an elongated ridge, said motion transmitting means being arranged to move said retaining member in the longitudinal direction of said ridge.

40. The connector of claim 38, wherein said displacing means comprises three plates including two outer plates with convex outer sides and a median plate, each of said outer plates defining with said median plate a discrete gap having portions of different widths.

41. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator, said displacing means having a front end arranged to move said retaining member and including a plurality of discrete resilient lugs which are angularly offset relative to each other in the second position of said retaining member and are substantially coplanar in the first position of said retaining member; motion transmitting means interposed between said actuator and said retaining member for effecting a movement of said retaining member, in the first position of said retaining member, to said retracted position in response to rotation of said actuator; and means for biasing said retaining member to said second position, said displacing means comprising a plurality of resilient sections arranged to apply to said retaining member a force in a direction to move the retaining member to said first position, the magnitude of said force exceeding the bias of said biasing means.

42. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support including a hollow housing having an internal space for said retaining member; an actuator rotatably mounted in said support, said actuator comprising a disc cam having a lobe; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator, said motion transmitting means comprising follower means tracking said lobe; and means for biasing said retaining member to said second position, said motion transmitting means being operative to move said retaining member to said retracted position exclusively by way of said biasing means, said biasing and motion transmitting means and said cam having intermediate portions which flank said lobe and the combined width of which equals the height of said internal space and of said motion transmitting means.

43. The connector of claim 42, further comprising means for rotating said actuator from a predetermined angular position to thereby move said retaining member to said first position by way of said displacing means and to said retracted position by way of said motion transmitting means, said lobe and said follower means cooperating to move said retaining member to retracted position following a predetermined first stage of rotation of said actuator from said angular position.

44. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support, said actuator comprising a disc cam having a lobe and a convex portion adjacent and lobe and having a center of curvature on the axis of rotation of said actuator; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator, said motion transmitting means comprising follower means tracking said lobe; and means for biasing said retaining member to said second position, said motion transmitting means being operative to move said retaining member to said retracted position exclusively by way of said biasing means and said motion transmitting means further having a concave portion which is adjacent said convex portion during the initial stage of angular movement of said actuator from a predetermined starting position toward engagement of said lobe with said motion transmitting means in order to retract said retaining member by way of said biasing means.

45. The connector of claim 44, wherein said concave portion has an outline such that the motion transmitting means is not shifted by the rotating cam during engagement of said concave portion by said lobe, said motion transmitting means including a follower portion adjacent said concave portion and arranged to effect a shifting of said motion transmitting means in response to engagement by said lobe.

46. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support, said actuator comprising a disc cam having a lobe and a projection which is spaced apart from the axis of rotation of said actuator; displacing means for effecting a movement of said retaining member to said first position in response to rotation of said actuator, said displacing means comprising a follower portion tracking said projection to effect a movement of said retaining member to said first position in response to rotation of said actuator; motion transmitting means interposed between said actuator and said retaining member for effecting a movement of said retaining member, in the first position of said retaining member, to said retracted position in response to rotation of said actuator, said motion transmitting means comprising follower means tracking said lobe; and means for biasing said retaining member to said second position, said motion transmitting means being operative to move said retaining member to said retracted position exclusively by way of said biasing means.

47. The connector of claim 46, wherein said follower portion of said displacing means has a substantially straight face which is engaged by said projection and intersects the path of movement of the projection about the axis of rotation of said actuator.

48. The connector of claim 46, wherein the orientation of said follower portion is such that said displacing means is shifted by said projection before said lobe shifts the motion transmitting means in response to rotation of said actuator from a predetermined angular position.

49. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support including a substantially U-shaped housing for said retaining member; an actuator rotatably mounted in said support; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator, said actuator and said retaining member and said displacing and motion transmitting means being disposed in said housing, said second member having an open front end adjacent the profiled member when the second member is coupled to the flange of the profiled member; means for biasing said retaining member to said second position; spring means for urging said retaining member to said extended position, said biasing and spring means being disposed in said housing; a rotary shaft disposed in said housing and having a coupling portion in torque-transmitting engagement with said actuator; and a spring element for urging said shaft axially to a position in which the shaft is rotatably journalled in said second member and said housing, said shaft being movable axially against the opposition of said spring element to a position in which it is disengaged from said second member and said retaining member, said biasing means, said actuator, said displacing means, said motion transmitting means, said spring means and said spring element can be withdrawn from said second member by way of said open front end.

50. A connector for separably securing at least one flange of a profiled member to a second member, comprising a support including a housing having two spaced apart sidewalls, a rear wall, an open front end opposite said rear wall and an additional wall between said sidewalls intermediate said rear end wall and said front end; retaining means including at least one retaining member disposed in said housing and movable between a first position of at least partial overlap with the one flange and a second position out of register with the one flange as well as back and forth between an extended position out of contact with and a retracted position of engagement with the one flange; an actuator rotatably mounted in said housing; displacing means for effecting a movement of said retaining member to said first position in response to rotation of said actuator; and motion transmitting means interposed between said actuator and said retaining member for effecting a movement of said retaining member, in the first position of said retaining member, to said retracted position in response to rotation of said actuator, said motion transmitting and said displacing means being disposed in said housing.

51. The connector of claim 50, wherein said additional wall is integral with one of said sidewalls.

52. A connector for separably securing two flanges of a profiled member wherein the flanges have free edges facing away from each other to a second member, comprising retaining means including pincers with two retaining members having confronting jaws each engageable with a different one of said flanges, said retaining members being movable between first positions of at least partial overlap with the respective flanges and second positions out of register with the respective flanges as well as back and forth between extended positions out of contact with and retracted positions of engagement with the respective flanges; a support; an actuator rotatably mounted in said support; displacing means for effecting a movement of said retaining members to said first positions in response to rotation of said actuator; motion transmitting means interposed between said actuator and said retaining members for effecting a movement of said retaining members, in the first positions of said retaining members, to said retracted positions in response to rotation of said actuator; and means for biasing said retaining members and their jaws apart to said second positions, said motion transmitting means comprising a common motion transmitting member for said retaining members and said jaws being arranged to overlap the respective flanges, once the flanges are disposed between said retaining members, in response to rotation of said actuator and attendant movement of said displacing means in a sense to move the jaws toward each other through the medium of said biasing means.

53. The connector of claim 52, wherein said support comprises a substantially U-shaped housing and said displacing means comprises two displacing members in said housing, said biasing means comprising two biasing members disposed between said displacing members each adjacent a different one of said displacing members, said biasing members having cam faces engaged by the respective displacing members to move said retaining members and their jaws to said first positions in response to rotation of said actuator from a predetermined angular position.

54. The connector of claim 53, wherein said actuator includes eccentrics for moving said displacing members with reference to said housing and the respective biasing members in a predetermined direction while said motion transmitting member moves said biasing members and said retaining members to said retracted positions counter to said predetermined direction.

55. A connector for separably securing two confronting flanges of a profiled member wherein the flanges define an aperture to a second member, comprising retaining means including two retaining members movable between first positions of at least partial overlap with the respective flanges and second positions out of register with the respective flanges as well as back and forth between extended positions out of contact with and retracted positions of engagement with the respective flanges; a support comprising a housing having an open front end facing the flanges; an actuator rotatably mounted in said support; displacing means for effecting a movement of said retaining member to said first position in response to rotation of said actuator, said displacing means comprising a locking bolt which is reciprocable by said actuator and has a substantially wedge-like portion arranged to advance between and to thereby move said retaining members to said first positions upon insertion of said bolt and portions of said retaining members into the aperture of the profiled member and in response to rotation of said actuator, said bolt comprising a frame surrounding an opening for said retaining members and said wedge-like portion facing said opening; and motion transmitting means interposed between said actuator and said retaining member for effecting a movement of said retaining member, in the first position of said retaining member, to said retracted position in response to rotation of said actuator, said actuator and said retaining members and said motion transmitting and displacing means being disposed in said housing.

56. The connector of claim 55, further comprising means for biasing said retaining members to said second positions, said biasing means having a second substantially wedge-like portion disposed in said opening opposite the wedge-like portion of said bolt and said retaining members having flanks adjacent and complementary to said wedge-like portions, said actuator being arranged to move one of said wedge-like portions toward the other of said wedge-like portions and to thereby move said retaining members away from one another to said first positions in response to rotation of said actuator from a predetermined angular position.

57. The connector of claim 56, wherein said motion transmitting means is interposed between said actuator and said bolt, said bolt being disposed within said biasing means, said biasing means further comprising prongs which bias said retaining members to said second positions, each of said retaining members being disposed between said second wedge-like portion and one of said prongs.

58. The connector of claim 57, wherein said biasing means comprises a substantially roof-shaped part which constitutes said second wedge-like portion.

59. The connector of claim 56, further comprising spring means for urging the one wedge-like portion away from the other wedge-like portion.

60. The connector of claim 59, wherein said spring means is an integral part of said biasing means.

61. The connector of claim 56, wherein said retaining members are mirror symmetrical to each other and are at least substantially confined in the opening of said bolt in said second positions thereof.

62. The connector of claim 56, wherein said bolt comprises a frame-like band and said wedge-like portion of the bolt is disposed within said band opposite said motion transmitting means, said actuator being located between said wedge-like portions and said motion transmitting means.

63. The connector of claim 62, wherein said band is a steel band.

64. The connector of claim 62, wherein said band has end portions anchored in said motion transmitting means.

65. The connector of claim 64, wherein said motion transmitting means has a slot for the end portions of said band, said slot being remote from said actuator.

66. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support; displacing means for effecting a movement of said retaining member to said first position in response to rotation of said actuator; motion transmitting means interposed between said actuator and said retaining member for effecting a movement of said retaining member, in the first position of said retaining member, to said retracted position in response to rotation of said actuator; means for rotating said actuator including a shaft having two cylindrical portions one of which is rotatably journalled in said second member and a coupling portion in torque-transmitting engagement with said actuator, said shaft being movable axially to and from an axial position in which said one cylindrical portion is disengaged from said second member; and spring means for yieldably urging said shaft to said axial position.

67. The connector of claim 66, wherein said support includes abutment means extending axially of one of said cylindrical portions and at least close to said coupling portion, at least in certain angular positions of said shaft.

68. A connector for separably securing at least one flange of a profiled member to a second member, comprising retaining means including at least one retaining member movable between a first position of at least partial overlap with the one flange and a second position out of register with the one flange as well as back and forth between an extended position out of contact with and a retracted position of engagement with the one flange; a support; an actuator rotatably mounted in said support, said actuator comprising two substantially disc-shaped eccentrics and means for connecting said eccentrics to each other, said connecting means comprising a pin and said eccentrics having holes for portions of said pin; displacing means for effecting a movement of said retaining member to said first position in response to rotation of said actuator, said connecting means being arranged to move said displacing means relative to said retaining means in response to rotation of said actuator; and motion transmitting means interposed between said actuator and said retaining member for effecting a movement of said retaining member, in the first position of said retaining member, to said retracted position in response to rotation of said actuator, said motion transmitting means comprising two rigidly interconnected motion transmitting members.

* * * * *